US008791399B2

(12) United States Patent
Nagamitsu et al.

(10) Patent No.: US 8,791,399 B2

(45) Date of Patent: Jul. 29, 2014

(54) INDUCTION HEATING COOKER, INDUCTION HEATING COOKING METHOD, INDUCTION HEATING COOKING PROGRAM, RESONANCE SOUND DETECTION DEVICE, RESONANCE SOUND DETECTION METHOD, AND RESONANCE SOUND DETECTION PROGRAM

(75) Inventors: Sachio Nagamitsu, Kyoto (JP); Makiko Noda, Osaka (JP)

(73) Assignee: Panasonic Corporation, Osaka (JP)

( * ) Notice: Subject to any disclaimer, the term of this patent is extended or adjusted under 35 U.S.C. 154(b) by 1468 days.

(21) Appl. No.: 12/299,962

(22) PCT Filed: May 1, 2007

(86) PCT No.: PCT/JP2007/059325

§ 371 (c)(1), (2), (4) Date: Nov. 7, 2008

(87) PCT Pub. No.: WO2007/132674

PCT Pub. Date: Nov. 22, 2007

(65) Prior Publication Data

US 2009/0173731 A1 Jul. 9, 2009

(30) Foreign Application Priority Data

May 11, 2006 (JP) ................................. 2006-132914
Nov. 21, 2006 (JP) ................................. 2006-314206

(51) Int. Cl.

| | |
|---|---|
| ***H05B 6/12*** | (2006.01) |
| ***A47J 27/62*** | (2006.01) |
| ***H02M 3/335*** | (2006.01) |
| ***G01D 18/00*** | (2006.01) |
| ***H05B 6/06*** | (2006.01) |

(52) U.S. Cl.

CPC ...................................... *H05B 6/062* (2013.01)

USPC ........... 219/622; 219/635; 219/649; 219/656; 219/660; 219/671; 99/328; 99/329 R; 99/330; 99/333; 99/374; 363/19; 363/95; 363/96; 363/79; 363/135; 73/1.01; 73/1.82; 73/570; 73/646; 73/662

(58) Field of Classification Search

USPC ......... 219/622, 621, 620, 624, 635, 649, 656, 219/668, 600, 626–628, 647, 660–667, 219/671–672; 99/328, 329 R, 330, 333–334, 99/374; 363/96, 95, 19, 37, 79, 86, 80, 97, 363/135; 73/1.01–1.03, 10.15, 1.46, 1.48, 73/1.66, 1.73, 1.82–1.83, 1.86, 570, 579, 73/584, 646, 648, 649, 662

See application file for complete search history.

(56) References Cited

U.S. PATENT DOCUMENTS 6,118,104 A 9/2000 Berkcan et al.
6,289,735 B1 * 9/2001 Dister et al. .................... 73/579

(56) References Cited

U.S. PATENT DOCUMENTS 6,770,857 B2 * 8/2004 Hirota et al. .................. 219/626
2003/0164373 A1 * 9/2003 Hirota et al. .................. 219/664

FOREIGN PATENT DOCUMENTS

| | | | |
|---|---|---|---|
| JP | 62-243282 | 10/1987 | |
| JP | 4-220991 | 8/1992 | |
| JP | 11-329698 | 11/1999 | |
| JP | 2002-352947 | 12/2002 | |
| JP | 2002-359063 | 12/2002 | |
| JP | 2003-77642 | 3/2003 | |
| JP | 2003-77643 | 3/2003 | |
| JP | 2003-77644 | 3/2003 | |
| JP | 2003077644 A * | 3/2003 | .............. H05B 6/12 |
| JP | 2004-213950 | 7/2004 | |
| JP | 2004-311187 | 11/2004 | |

OTHER PUBLICATIONS

JP2003077644_A.pdf machine translation.*
Supplementary European Search Report issued Nov. 8, 2011 in Application No. EP 07 74 2760.

(56) References Cited

OTHER PUBLICATIONS

International Search Report issued Jul. 17, 2007 in the International (PCT) Application No. PCT/JP2007/059325.

* cited by examiner

*Primary Examiner* — Dana Ross
*Assistant Examiner* — Ket D Dang
(74) *Attorney, Agent, or Firm* — Wenderoth, Lind & Ponack, L.L.P.

(57) ABSTRACT

An object of the invention is to accurately detect a state of an object to be heated in a cooking vessel and effectively avoid cooking failure. An induction heating section (13) inductively heats a cooking vessel (11). A vibration detecting section (14) detects a vibration of the cooking vessel (11) via a top plate (12). A vibration waveform extracting section (15) extracts a vibration waveform of a frequency component having a frequency equal to a predetermined multiplication product of an induction heating frequency, from a waveform of the vibration detected by the vibration detecting section (14). A determining section (16) determines a state of an object to be heated, based on the vibration waveform extracted by the vibration waveform extracting section (15).

9 Claims, 30 Drawing Sheets

INDUCTION HEATING COOKER, INDUCTION HEATING COOKING METHOD, INDUCTION HEATING COOKING PROGRAM, RESONANCE SOUND DETECTION DEVICE, RESONANCE SOUND DETECTION METHOD, AND RESONANCE SOUND DETECTION PROGRAM

TECHNICAL FIELD

The present invention relates to an induction heating cooker, an induction heating cooking method, and an induction heating cooking program for inductively heating a cooking vessel containing an object to be heated therein, and also relates to a resonance sound detection device, a resonance sound detection method, and a resonance sound detection program for detecting a resonant sound.

BACKGROUND ART

As a conventional induction heating cooker, there is known an induction heating cooker recited in e.g. patent document 1. FIG. 31 is a diagram showing an arrangement of the conventional induction heating cooker. As shown in FIG. 31, the conventional induction heating cooker is constructed in such a manner that a vibration detecting section 114 is provided at a position underneath a top plate 112, on which a cooking vessel 111 is to be placed, to detect a vibration resulting from generation, detachment, disappearance and the like of air bubbles which may occur by heating an induction heating coil 113. A vibration amplifying section 115 detects a vibration of the cooking vessel 111 via the top plate 112. Upon detecting generation of air bubbles resulting from boiling, a boiling determining section 116 detects whether an object to be heated has been boiled, and a heating controlling section 117 reduces the output of the induction heating coil 113 to avoid overflow of air bubbles and the like.

A conventional approach for detecting a temperature of the top plate 112 by a thermistor or a like device is directed to improve degradation of responsiveness resulting from a low thermal conductivity of the top plate 112 or the like. FIG. 32 is a graph showing a time-based change in vibration waveform of the induction heating cooker recited in patent document 1. As shown in FIG. 32, the temperature of an object to be heated i.e. water is increased by a high-frequency induction heating at about 20 kHz. As the water temperature is increased, partial boiling occurs from a bottom surface of the cooking vessel 111, and a vibration at a relatively low frequency of 10 kHz or less is sharply increased. Then, as the water temperature approaches the boiling point, air bubbles grow into large air bubbles, and a vibration is slightly reduced. After the object to be heated has been boiled, the magnitude of vibration is settled to a certain level. The boiling determining section 116 of the conventional induction heating cooker detects whether the object to be heated has been boiled, based on the above change in the vibration waveform.

In the case where a cooking vessel 111 is fluorine coated, an air bubble generating condition is different from the above case. Accordingly, a time-based change in vibration of the cooking vessel 111 is different from the above case. FIG. 33 is a graph showing a time-based change in vibration waveform of an induction heating cooker recited in patent document 2. As shown in FIG. 33, in an initial stage of air bubble generation, the induction heating cooker 111 is vibrated at a low frequency of 10 kHz or less, at which the vibration is relatively easily transmitted. However, since air bubbles grow from a bottom part of the cooking vessel 111, a vibration resulting from detachment or disappearance of air bubbles is less likely to be detected. By the time when the size of the air bubbles is sufficiently increased, and the large air bubbles are detached from the bottom part of the cooking vessel 111, the temperature of the entirety of the object to be heated is also sufficiently increased. At this time, the air bubbles reach a top surface of the object to be heated, and are released into the air, without disappearing before reaching the top surface of the object to be heated. A boiling determining section 116 determines whether the object to be heated has been boiled, based on a change in the vibration waveform output (see e.g. patent document 2).

In patent document 1, the point of time T2, at which it is determined that the object to be heated has been boiled, is delayed from the point of time T1 corresponding to the boiling point 911 shown in FIG. 32. This may be inverse in time depending on the kind of the cooking vessel 111. Also, in the case where the object to be heated includes a material other than water, and a solid matter such as a foodstuff is put into the cooking vessel 111 in the course of cooking, it is impossible to determine whether the foodstuff has been put in before air bubble generation, although it is possible to detect lowering of air bubble generation resulting from temperature lowering if the air bubbles have already been generated.

In particular, patent document 2 recites a method which is also feasible in the case where a fluorine-coated cooking vessel is used. However, in recent years, a product formed with an aluminum alloy plate layer having a thickness of 4 to 5 mm or more on or around the center on a bottom surface of a cooking vessel 111 has been increasingly used to enhance thermal efficiency by induction heating. Therefore, it is substantially difficult to detect a vibration corresponding to detachment of large air bubbles or burst of air bubbles at a top part of the object to be heated, and it is impossible to avoid overflow of air bubbles and the like by detecting whether the object to be heated has been boiled. In other words, it is less likely to obtain the output voltage as shown in FIG. 33.

As another drawback, in the case where a cooking vessel containing an object to be heated is heated with use of an induction heating cooker, the cooking vessel may be resonated with a vibration of the induction heating cooker, with the result that a resonant sound may be generated. In the conventional induction heating cooker, it is difficult to detect whether a resonant sound has been generated, and it is difficult to suppress generation of a resonant sound.

Patent document 1: Japanese Unexamined Patent Publication No. Sho 62-243282

Patent document 2: Japanese Unexamined Patent Publication No. 2003-77643

DISCLOSURE OF THE INVENTION

In view of the above conventional drawbacks, it is an object of the invention to provide an induction heating cooker, an induction heating cooking method, and an induction heating program that enable to accurately detect a state of an object to be heated in a cooking vessel, and effectively avoid cooking failure.

It is another object of the invention to provide a resonance sound detection device, a resonance sound detection method, and a resonance sound detection program that enable to accurately detect a resonant sound, and effectively suppress generation of a resonant sound.

An induction heating cooker according to an aspect of the invention includes: an induction heating section for inductively heating a cooking vessel for containing an object to be heated; a vibration detecting section for detecting a vibration of the cooking vessel; a vibration waveform extracting section for extracting a vibration waveform of a frequency component having a frequency of about twice as large as an induction heating frequency, from a waveform of the vibration detected by the vibration detecting section; and a determining section for determining a state of the object to be heated, based on the vibration waveform extracted by the vibration waveform extracting section.

An induction heating cooking method according to another aspect of the invention includes: an induction heating step of inductively heating a cooking vessel for containing an object to be heated; a vibration detecting step of detecting a vibration of the cooking vessel; a vibration waveform extracting step of extracting a vibration waveform of a frequency component having a frequency of about twice as large as an induction heating frequency, from a waveform of the vibration detected in the vibration detecting step; and a determining step of determining a state of the object to be heated, based on the vibration waveform extracted in the vibration waveform extracting step.

An induction heating cooking program according to yet another aspect of the invention causes a computer to function as: an induction heating section for inductively heating a cooking vessel for containing an object to be heated; a vibration detecting section for detecting a vibration of the cooking vessel; a vibration waveform extracting section for extracting a vibration waveform of a frequency component having a frequency of about twice as large as an induction heating frequency, from a waveform of the vibration detected by the vibration detecting section; and a determining section for determining a state of the object to be heated, based on the vibration waveform extracted by the vibration waveform extracting section.

In the above arrangements, the induction heating section is operable to inductively heat the cooking vessel for containing the object to be heated, and the vibration detecting section is operable to detect the vibration of the cooking vessel. Then, the vibration waveform extracting section is operable to extract the vibration waveform of the frequency component having the frequency of about twice as large as the induction heating frequency from the waveform of the vibration detected by the vibration detecting section. Then, the determining section is operable to determine the state of the object to be heated, based on the vibration waveform extracted by the vibration waveform extracting section.

A resonance sound detection device according to another aspect of the invention includes: a vibration source; a vibration detecting section for detecting a vibration of a vibrating member to be vibrated by the vibration source; and a resonant sound detecting section for detecting a resonant sound to be generated from the vibrating member resulting from resonating with a vibration of the vibration source, based on a waveform of the vibration detected by the vibration detecting section.

A resonance sound detection method according to yet another aspect of the invention includes: a vibration controlling step of vibrating a vibration source; a vibration detecting step of detecting a vibration of a vibrating member to be vibrated by the vibration source; and a resonant sound detecting step of detecting a resonant sound to be generated from the vibrating member resulting from resonating with a vibration of the vibration source, based on a waveform of the vibration detected in the vibration detecting step.

A resonance sound detection program according to still another aspect of the invention causes a computer to function as: a vibration controlling section for vibrating a vibration source; a vibration detecting section for detecting a vibration of a vibrating member to be vibrated by the vibration source; and a resonant sound detecting section for detecting a resonant sound to be generated from the vibrating member resulting from resonating with a vibration of the vibration source, based on a waveform of the vibration detected by the vibration detecting section.

In the above arrangements, the vibration detecting section is operable to detect the vibration of the vibrating member to be vibrated by the vibration source. Then, the resonant sound detecting section is operable to detect the resonant sound to be generated from the vibrating member resulting from resonating with the vibration of the vibration source, based on the waveform of the vibration detected by the vibration detecting section.

According to the invention, the vibration waveform of the frequency component having the frequency of about twice as large as the induction heating frequency is extracted. The extracted vibration waveform is compared with the predetermined value, and the state of the object to be heated is determined. This enables to accurately detect the state of the object to be heated in the cooking vessel. Also, the above arrangements are advantageous in effectively avoiding cooking failure such as overflow of air bubbles and the like by e.g. detecting whether the object to be heated is in a boiling state, and adjusting the quantity of heat to be applied to the cooking vessel based on the detection result.

According to the invention, generation of a resonant sound can be securely detected by observing the vibration waveform of the vibrating member to be vibrated by the vibration source.

BEST MODE FOR CARRYING OUT THE INVENTION

Figure 1:
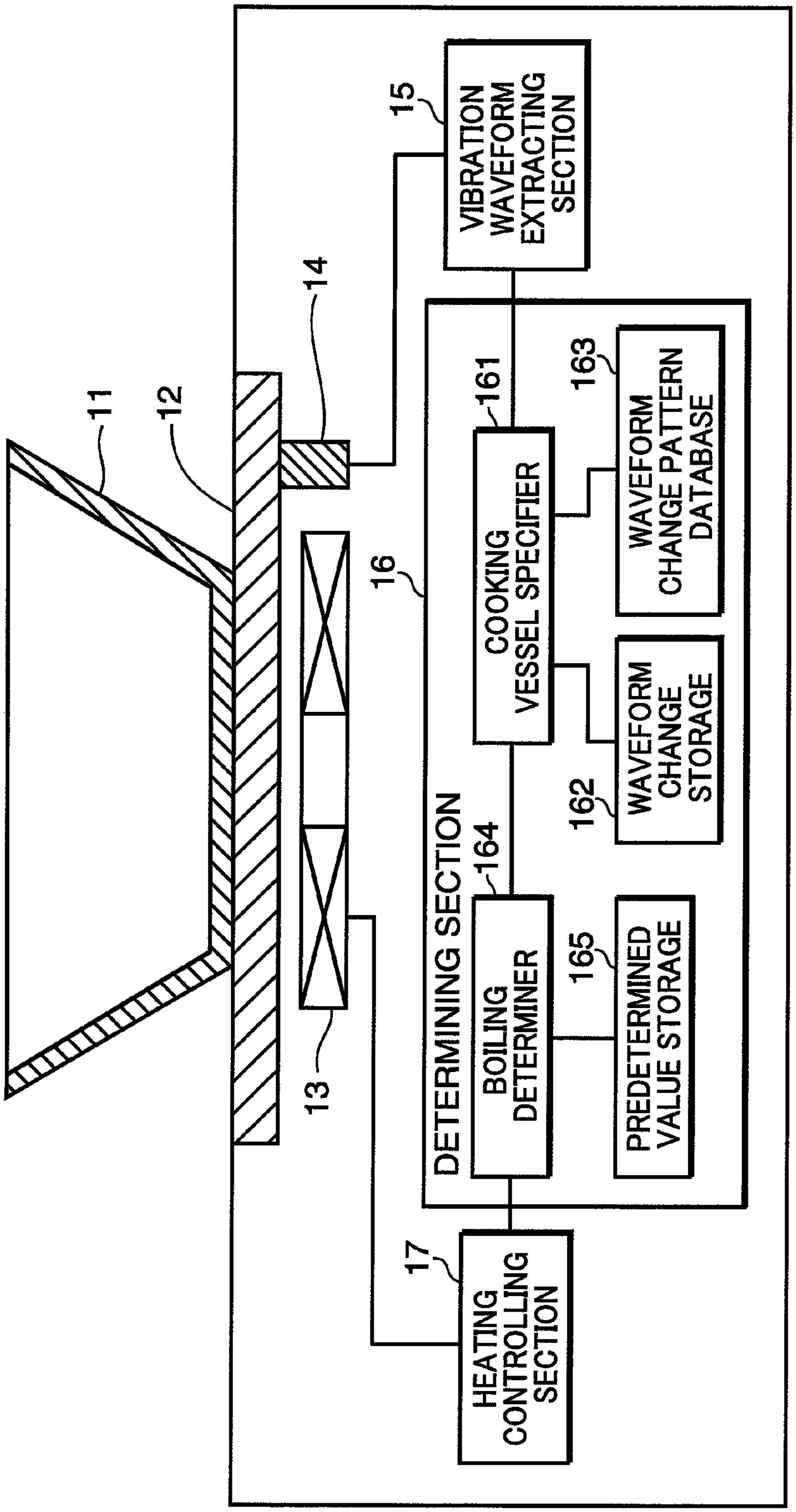
FIG. 1 is a diagram showing an arrangement of an induction heating cooker in accordance with a first embodiment of the invention.

In the following, induction heating cookers in accordance with embodiments of the invention are described referring to the drawings.

FIG. 1 is a diagram showing an arrangement of an induction heating cooker in accordance with a first embodiment of the invention. The induction heating cooker shown in FIG. 1 includes a top plate 12, an induction heating section 13, a vibration detecting section 14, a vibration waveform extracting section 15, a determining section 16, and a heating controlling section 17. The top plate 12 is a non-magnetic member, and is adapted to place a cooking vessel 11 containing an object to be heated. The induction heating section 13 is provided at a position underneath the top plate 12 to inductively heat the cooking vessel 11. The vibration detecting section 14 is provided at a lower surface of the top plate 12 to detect a vibration based on a repulsion force to be applied to the cooking vessel 11 by electromagnetic induction. The vibration waveform extracting section 15 extracts a vibration waveform of a frequency component having a frequency of about twice as large as the induction heating frequency, from an output signal outputted from the vibration detecting section 14. The determining section 16 determines a state of the object to be heated by comparing an output of the vibration waveform with a predetermined value. The heating controlling section 17 controls the induction heating section 13 in accordance with a determination result by the determining section 16.

In this embodiment, a vibration waveform of a frequency component having a frequency of about twice as large as the induction heating frequency is extracted. It is preferable, however, to extract a vibration waveform of a frequency component having a frequency of about 1.95 to 2.05 times as large as the induction heating frequency, considering a vibration error which may occur in the case where the induction heating output does not correspond to a sinusoidal waveform; and more preferable to extract a vibration waveform of a frequency component having a frequency of about 1.99 to 2.01 times as large as the induction heating frequency, considering an error which may occur in digital processing.

The vibration detecting section 14 is a piezoelectric ceramics sensor in contact with the lower surface of the top plate 12 to detect a vibration of the cooking vessel 11 containing an object to be heated via the top plate 12. The object to be heated is e.g. a liquid such as water. The vibration detecting section 14 in the first embodiment is e.g. a piezoelectric ceramics sensor. Alternatively, another vibration sensor such as a vibration pickup coil may be used, or an ultrasonic sensor or a like device, which is inherently designed to detect vibrations in the air, may be used. In other words, the vibration detecting section 14 is not limited to a specific sensor. Concerning the installation position of the vibration detecting section 14, the vibration detecting section 14 may be installed at any position on the lower surface of the top plate 12. Further alternatively, the installation position of the vibration detecting section 14 is not limited to the lower surface of the top plate 12. Generally, however, an arrangement that the vibration detecting section 14 does not protrude from an upper surface of the top plate 12 is an important feature as a product, considering usability of the user.

What can be sensed from underneath the top plate 12 is limited to a temperature, light, and vibrations. Accordingly, it is possible to install the vibration detecting section 14 on an upper surface of the top plate 12 in contact therewith, according to needs. Further alternatively, the vibration detecting section 14 may be configured to detect vibrations in the air. Considering that the induction heating frequency is 20 kHz or more, the frequency band to be detected should be an ultrasonic frequency band, in place of 20 kHz or less corresponding to a conventional audible frequency band. For instance, in the case where the induction heating frequency is 30 kHz, it is necessary to configure the vibration detecting section 14 in such a manner that the vibration detecting section 14 is capable of detecting 60 kHz, which is a frequency of about twice as large as the induction heating frequency, or its vicinity.

FIG. 1 is a cross-sectional view of the induction heating cooker. When heating is started by operating an unillustrated power source switch, the heating controlling section 17 supplies a predetermined electric power to the induction heating section 13 constituted of a coil. When the electric power is supplied to the induction heating section 13, a magnetic field by electromagnetic induction is generated. Then, an eddy current is generated at a lower part of the cooking vessel 11 over the top plate 12, and the cooking vessel 11 is heated. As a result, the object to be heated in the cooking vessel 11 is heated and cooked by heat transfer from the cooking vessel 11.

Figure 2:
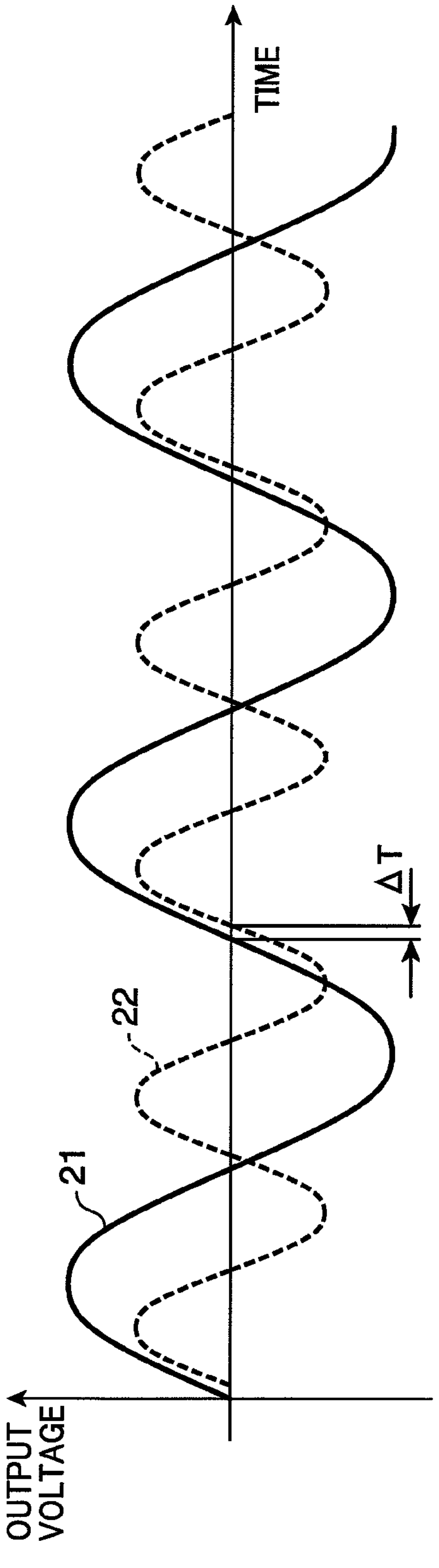
FIG. 2 is a waveform diagram showing a magnetic field waveform to be generated by an induction heating section, and a vibration waveform to be detected by a vibration detecting section.

During the above operation, an upward force is applied to the cooking vessel 11 by a repulsion force in the magnetic field resulting from the eddy current generated at the lower part of the cooking vessel 11. The cycle of generation of the repulsion force is twice as large as the induction heating cycle. FIG. 2 is a waveform diagram showing a magnetic field waveform to be generated by the induction heating section, and a vibration waveform to be detected by the vibration detecting section. As shown in FIG. 2, in the case where a magnetic field waveform 21 is generated at a predetermined cycle by the induction heating section 13, directions of an eddy current to be generated in two induction magnetic fields i.e. positive and negative magnetic fields in one cycle are opposite to each other. Since the polarities of the magnetic fields are opposite to each other, the repulsion force is applied to the cooking vessel 11 two times within one cycle of the magnetic field waveform. Accordingly, the repulsion force (i.e. a floating force) is applied to the cooking vessel 11 at a cycle of twice as large as the induction heating frequency. The cycle of a vibration waveform 22 to be detected by the vibration detecting section 14 in FIG. 2 is delayed from the cycle of the magnetic field waveform 21 by a predetermined duration $\Delta T$, and the vibration waveform 22 is observed at a cycle of twice as large as the cycle of the magnetic field waveform 21. The duration $\Delta T$ is generated by a difference between the position of the cooking vessel 11 and the position of the vibration detecting section 14. Accordingly, the duration $\Delta T$ can be predicted by a speed (about 1,500 m/s) of ultrasonic vibrations which are transmitted through the top plate 12 as solid vibrations.

Figure 3:
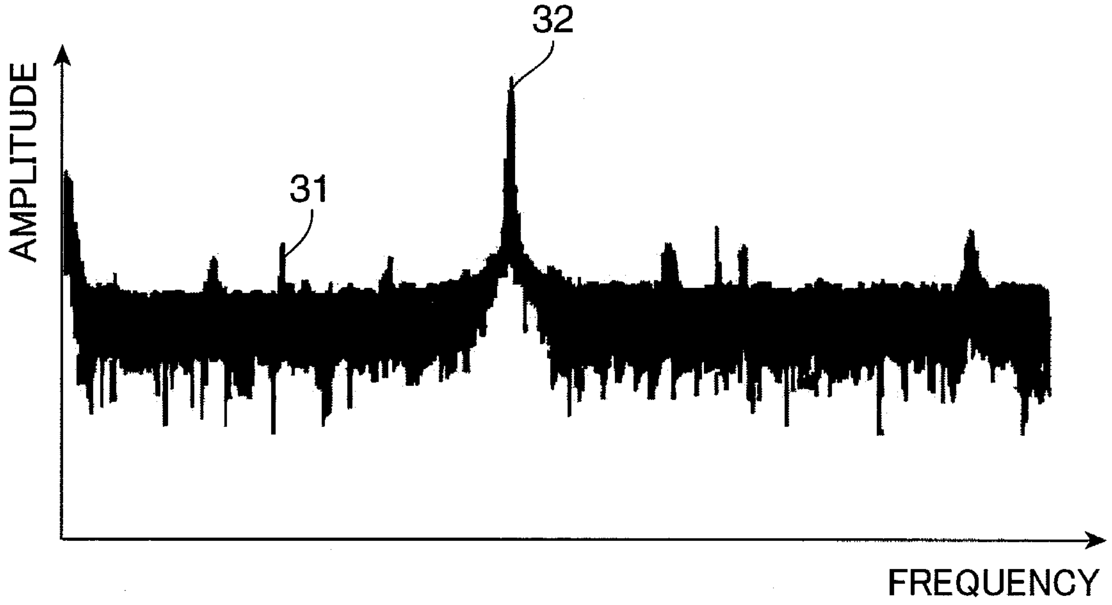
FIG. 3 is a diagram showing an FFT result of a vibration waveform to be detected by the vibration detecting section.

In the following, the vibration waveform extracting section 15 shown in FIG. 1 is described. FIG. 3 is a diagram showing an FFT result of a vibration waveform to be detected by the vibration detecting section. Since a magnitude (i.e. a spectrum) of a frequency component can be calculated on a real-time basis by performing an FFT (Fast-Fourier Transformation), it is easy to observe the vibration waveform with use of a spectral analyzer or a like device, and it is also easy to incorporate the FFT in the household electric appliance. In FIG. 3, the axis of abscissas indicates a frequency, and the axis of ordinate indicates an amplitude. The vibration detecting section 14 is a kind of a capacitor. Accordingly, a waveform 31 of the induction heating section 13 is extracted as induction noise. In addition to the above, it is highly likely that a high frequency noise of an electronic circuit such as the heating controlling section 17, or a harmonic may be included. However, a vibration of the cooking vessel 11 is a largest amplitude component to be detected by the vibration detecting section 14. Accordingly, a vibration waveform 32 of a frequency component having a frequency of about twice as large as the induction heating frequency is detected.

The induction heating frequency of a heating coil in the induction heating section 13 in the first embodiment is a known value which is defined depending on a design configuration or an operating condition of a product. Accordingly, the vibration waveform extracting section 15 is operable to extract a vibration waveform of a cooking vessel by separating a vibration waveform of a frequency of about twice as large as the known induction heating frequency by a fast Fourier transformation.

Figure 4:
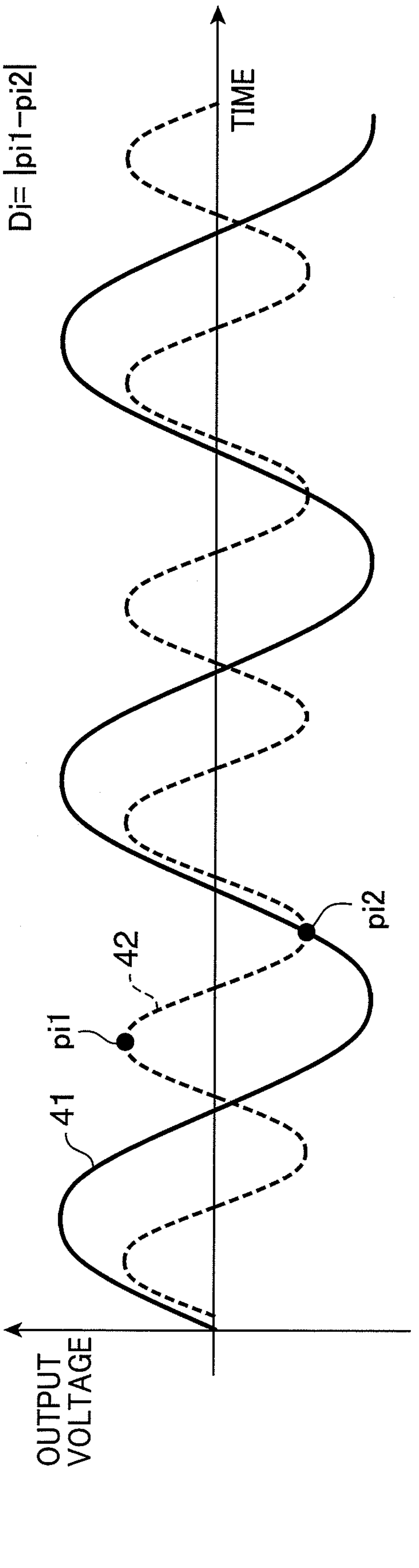
FIG. 4 is a diagram for describing another method for extracting an amplitude of a vibration waveform of a cooking vessel in the first embodiment.

Next, another method for extracting an amplitude of a frequency component having a frequency of about twice as large as the induction heating frequency by the vibration waveform extracting section 15 is described. FIG. 4 is a diagram for describing the method for extracting an amplitude of a vibration waveform of the cooking vessel in the first embodiment. The vibration waveform extracting section 15 directly extracts a frequency component having a frequency of about twice as large as the induction heating frequency from a vibration waveform 42 to be detected by the vibration detecting section 14, based on a harmonic to be generated from the induction heating section 13 as a reference signal 41. The indications "pi1" and "pi2" in FIG. 4 correspond to a peak position and a bottom position of an output voltage, respectively. The vibration waveform extracting section 15 calculates an absolute value of a difference between an output voltage (i.e. a peak value) at the peak position "pi1", and an output voltage (i.e. a bottom value) at the bottom position "pi2", as an amplitude "Di". The amplitude "Di" is a value corresponding to the amplitude of a frequency component having a frequency of about twice as large as the induction heating frequency in FIG. 3. In many cases, the induction heating frequency is 20 kHz or more. Assuming that the induction heating frequency to be used in the embodiment is 30 kHz, a frequency component is extracted from an ultrasonic waveform of 60 kHz. This configuration is feasible, although the circuit configuration may be slightly complex. The method shown in FIG. 4 is advantageous in discriminating and determining a state of the object to be heated individually with respect to each of cooking vessels 11, in the case where a plurality of induction heating sections 13 are provided, as will be described later.

The determining section 16 includes a cooking vessel specifier 161, a waveform change storage 162, a waveform change pattern database 163, a boiling determiner 164, and a predetermined value storage 165. The cooking vessel specifier 161 retrieves only a maximum value of the amplitude extracted by the vibration waveform extracting section 15 at a predetermined sampling time interval. The waveform change storage 162 stores the maximum value of the amplitude of the vibration waveform retrieved by the cooking vessel specifier 161 in a time-series manner. The waveform change pattern database 163 stores waveform change patterns relating to time-based changes in a vibration waveform with respect to each of the kinds of the cooking vessels. In the first embodiment, the waveform change pattern database 163 stores the waveform change patterns individually with respect to each of the kinds of the cooking vessels. The invention is not specifically limited to the above. Alternatively, the waveform change patterns may be stored with respect to each of the kinds of the objects to be heated, or with respect to each of the quantities of the objects to be heated. Further alternatively, the waveform change patterns may be stored in correlation to at least one of the kind of the cooking vessel, the kind of the object to be heated, and the quantity of the object to be heated.

Further, the cooking vessel specifier 161 compares a waveform change pattern read out from the waveform change pattern database 163 with a waveform change pattern stored in the waveform change storage 162 to specify the kind of the cooking vessel placed on the top plate 12. In the first embodiment, the cooking vessel specifier 161 specifies the kind of the cooking vessel. The invention is not specifically limited to the above. Alternatively, the kind of the object to be heated, or the quantity of the object to be heated may be specified. Further alternatively, at least one of the kind of the cooking vessel, the kind of the object to be heated, and the quantity of the object to be heated may be specified.

The predetermined value storage 165 stores predetermined values to be used as a criteria for determining whether the object to be heated has been boiled. In the first embodiment, the predetermined value storage 165 stores the predetermined values with respect to each of the kinds of the cooking vessels. The invention is not specifically limited to the above. Alternatively, the predetermined values may be stored with respect to each of the kinds of the objects to be heated, or with respect to each of the quantities of the objects to be heated. Further alternatively, the predetermined values may be stored in correlation to at least one of the kind of the cooking vessel, the kind of the object to be heated, and the quantity of the object to be heated. The boiling determiner 164 compares a maximum value of an amplitude of a vibration waveform stored in the waveform change storage 162 with a predetermined value read out from the predetermined value storage 165 to determine whether the object to be heated in the cooking vessel is in a boiling state.

The vibration waveform shown in FIG. 4 is not a vibration waveform including a vibration waveform of other frequency, but is a vibration waveform of a frequency component having a frequency of about twice as large as the induction heating frequency. Accordingly, the amplitude of the frequency component having the frequency of about twice as large as the induction heating frequency shown in FIG. 3 coincides with the absolute value of the difference between the peak value and the bottom value in the vibration waveform. However, in an actual operation, the vibration detecting section 14 detects a vibration waveform including a low-frequency vibration waveform (i.e. a vibration waveform at the time of boiling in an audible frequency band) in addition to a vibration waveform of an electromagnetic induction itself, and other noise waveform. As a result, a waveform to be detected by the actual operation is a waveform, wherein a vibration waveform of a frequency component having a frequency of about twice as large as the induction heating frequency is included in a waveform having a larger cycle than the cycle of the waveform shown in FIG. 4.

In the above condition, similarly to the foregoing condition, the vibration waveform extracting section 15 calculates an absolute value of a difference between a peak value and a bottom value, and extracts the calculated absolute value as an amplitude. The waveform change pattern database 163 and the predetermined value storage 165 also store waveform change patterns and predetermined values corresponding to the vibration waveforms of other frequencies, respectively. The cooking vessel specifier 161 specifies the kind of the cooking vessel by comparing an amplitude extracted by the vibration waveform extracting section 15 with a waveform change pattern stored in the waveform change pattern database 163. The boiling determiner 164 determines whether the object to be heated has been boiled by comparing an amplitude extracted by the vibration waveform extracting section 15 with a predetermined value stored in the predetermined value storage 165.

In the first embodiment, the induction heating section 13 corresponds to an example of an induction heating section, the vibration detecting section 14 corresponds to an example of a vibration detecting section, the vibration waveform extracting section 15 corresponds to an example of a vibration waveform extracting section, the determining section 16 corresponds to an example of a determining section, the waveform change pattern database 163 corresponds to an example of a waveform change pattern storing section, the cooking vessel specifier 161 corresponds to an example of a waveform change pattern specifying section, and the heating controlling section 17 corresponds to an example of a heating controlling section.

Figure 5:
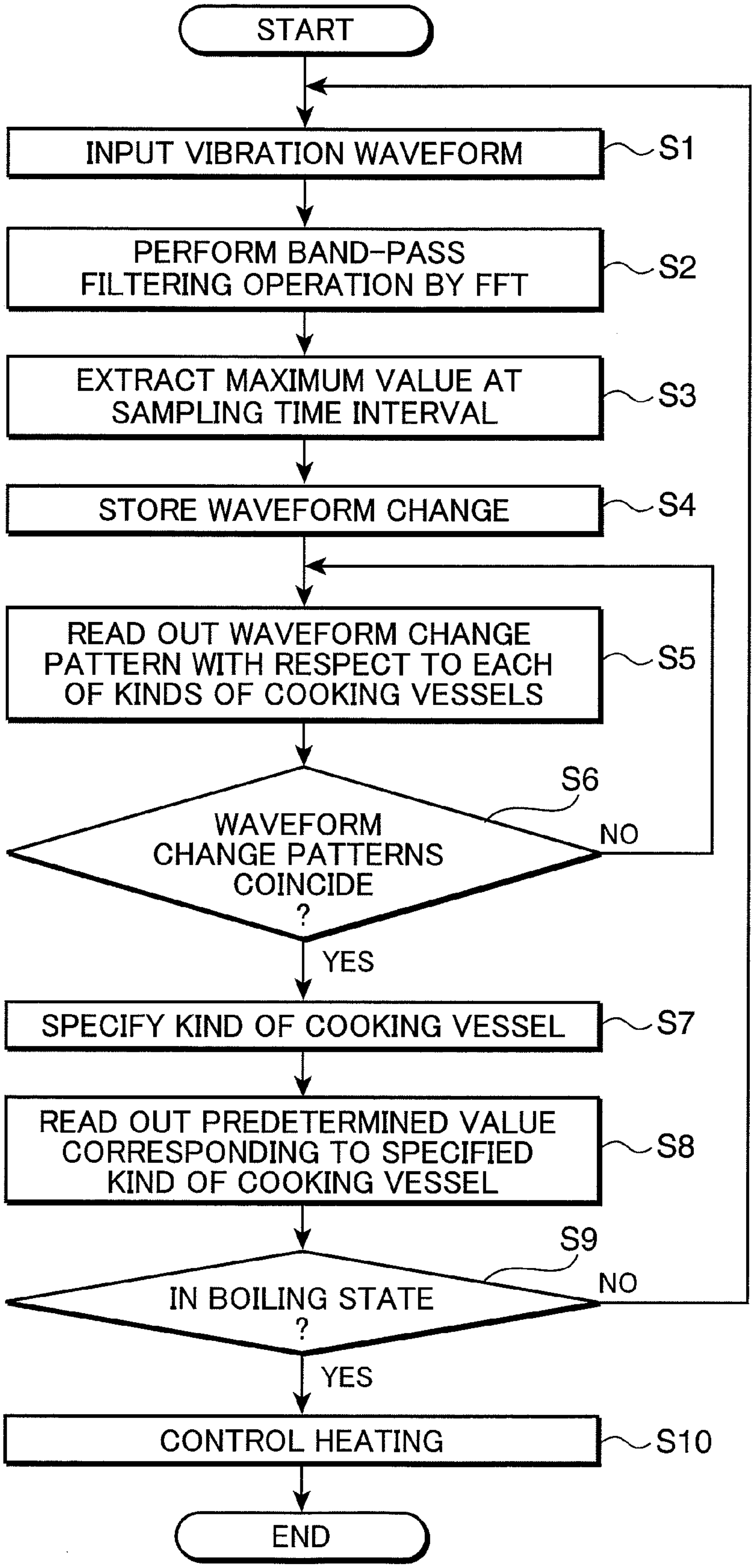
FIG. 5 is a flowchart for describing an operation to be performed by the induction heating cooker in the first embodiment.

Next, an operation to be performed by the induction heating cooker in the first embodiment is described. FIG. 5 is a flowchart for describing the operation to be performed by the induction heating cooker in the first embodiment. First, the vibration detecting section 14 inputs a vibration waveform to the vibration waveform extracting section 15 (Step S1). Then, the vibration waveform extracting section 15 extracts an amplitude of a frequency component having a frequency of about twice as large as the induction heating frequency by performing a band-pass filtering operation on the inputted vibration waveform, using an FFT (Step S2). In the first embodiment, the amplitude extracting operation with use of the FFT described with reference to FIG. 3 is recited. A similar effect as described above can be obtained by the extracting method described with reference to FIG. 4.

Subsequently, the cooking vessel specifier 161 retrieves only a maximum value of the output from the vibration waveform extracting section 15 extracted at a predetermined sampling time interval (Step S3). Then, the cooking vessel specifier 161 stores the retrieved maximum value of the amplitude of the vibration waveform into the waveform change storage 162 in a time-series manner (Step S4). Then, the cooking vessel specifier 161 reads out waveform change pattern data relating to time-based changes in vibration waveform which is pre-stored in the waveform change pattern database 163 with respect to each of the kinds of the cooking vessels (Step S5).

Subsequently, the cooking vessel specifier 161 compares the waveform change pattern read out from the waveform change pattern database 163 with a waveform change pattern stored in the waveform change storage 162 to judge whether the waveform change patterns coincide with each other (Step S6). If it is judged that the waveform change pattern read out from the waveform change pattern database 163 does not coincide with the waveform change pattern stored in the waveform change storage 162 (NO in Step S6), the routine returns to the operation in Step S5, and the cooking vessel specifier 161 reads out another waveform change pattern corresponding to the other kind of the cooking vessel from the waveform change pattern database 163.

If, on the other hand, it is judged that the waveform change pattern read out from the waveform change pattern database 163 coincides with the waveform change pattern stored in the waveform change storage 162 (YES in Step S6), the cooking vessel specifier 161 specifies the kind of the cooking vessel (Step S7). Specifically, the cooking vessel specifier 161 specifies that the kind of the cooking vessel currently placed on the top plate 12 coincides with the kind of the cooking vessel corresponding to the waveform change pattern read out from the waveform change pattern database 163.

Subsequently, the boiling determiner 164 reads out a predetermined value corresponding to the kind of the cooking vessel specified by the cooking vessel specifier 161 from the predetermined value storage 165 (Step S8). Then, the boiling determiner 164 determines whether the object to be heated in the cooking vessel is in a boiling state (Step S9). Specifically, the boiling determiner 164 determines whether the maximum value of the amplitude of the vibration waveform stored in the waveform change storage 162 has reached the predetermined value read out from the predetermined value storage 165. If it is judged that the maximum value of the amplitude of the vibration waveform has reached the predetermined value, the boiling determiner 164 determines that the object to be heated is in a boiling state. If it is judged that the maximum value of the amplitude of the vibration waveform has not reached the predetermined value, the boiling determiner 164 determines that the object to be heated is not in a boiling state.

Figure 6:
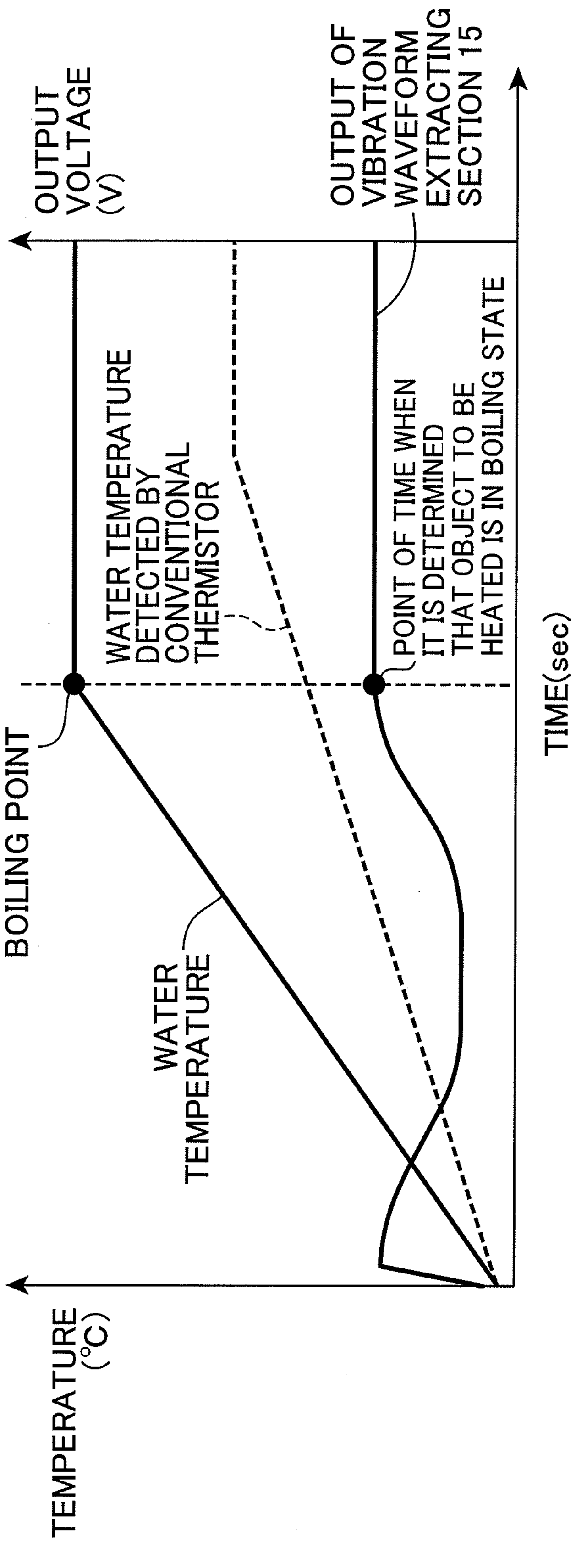
FIG. 6 is a graph showing a time-based change in vibration waveform to be obtained in the case where an ordinary cooking vessel is heated.

There is a case, however, that the boiling determiner 164 may determine that the object to be heated is in a boiling state merely based on a waveform change pattern, if the waveform change patterns coincide with each other, despite that the maximum value of the amplitude of the vibration waveform has not reached the predetermined value. For instance, in the case where the waveform change pattern is as shown in FIG. 6, the output voltage which is temporarily lowered with time is gradually increased toward a temperature corresponding to a boiling state, and finally the waveform change shows that the output voltage is saturated at a certain value at the same timing as the point of time when the water temperature reaches the boiling point. Defining the above change that the output voltage is saturated at a certain value as one of the waveform change patterns enables to make a practical determination as to a boiling state in many cases.

In other words, if it is judged that the waveform change patterns coincide with each other (YES in Step S6), the boiling determiner 164 may determine that the object to be heated is in a boiling state in Step S9 of determining whether the object to be heated in the cooking vessel is in a boiling state, without using a judgment as to whether the maximum value of the amplitude of the vibration waveform has reached the predetermined value read out from the predetermined value storage 165, as a determination requirement. In this modification, determination as to whether the predetermined value read out from the predetermined value storage 165 is used is made at the time of determining the waveform change pattern (i.e. in Step S6).

If it is judged that the object to be heated is not in a boiling state (NO in Step S9), the routine returns to Step S1, and the operations from Step S1 through S9 are repeatedly executed until it is determined that the object to be heated is in a boiling state. If, on the other hand, it is determined that the object to be heated is in a boiling state (YES in Step S9), the heating controlling section 17 controls the electric power output of the induction heating section 13 in accordance with a determination result on a boiling state (Step S10).

In this section, the operation in Step S3 in FIG. 5 is described in detail. The cooking vessel specifier 161 retrieves only the maximum value of the output from the vibration waveform extracting section 15 extracted at a predetermined sampling time interval. The maximum value greatly differs depending on a generating condition of air bubbles from the object to be heated in the cooking vessel 11. As described above, a vibration of the cooking vessel 11 is caused by a repulsion force in a magnetic field to be generated by induction heating, and the vibration is affected by a state of the object to be heated in the cooking vessel 11.

For instance, in the case where water is boiled, air bubbles are generated from a bottom part of the cooking vessel by heating. As a result, the acoustic impedance of the entirety of the object to be heated is changed. Specifically, since the vibration waveform is in an ultrasonic frequency band, ultrasonic vibrations to be transmitted from a solid inner wall of the cooking vessel 11 to a liquid i.e. the object to be heated are normally attenuated by repeated reflection on a water surface corresponding to an upper surface of the object to be heated, or a side wall of the cooking vessel 11. In other words, an ultrasonic wave has the following transmitting characteristic. The ultrasonic wave is relatively easily transmitted from a solid to a liquid or a gas. However, the transmitting efficiency of the ultrasonic wave from a liquid to a solid or an air layer is exceedingly lowered, and the ultrasonic wave is substantially reflected on a boundary surface between the liquid and the solid/air layer. A reflectance of the ultrasonic wave at the boundary surface is determined based on a ratio of the acoustic velocity in a material to the acoustic velocity in another material in contact with the material. However, once air bubbles are generated, ultrasonic vibrations from a bottom surface of the cooking vessel 11 are instantaneously reflected by the air bubbles generated in the vicinity of the bottom surface. Accordingly, the ultrasonic vibrations of the cooking vessel 11 are transmitted to the top plate 12 by reflection from the object to be heated via the cooking vessel 11 itself. As a result, the vibration detecting section 14 installed underneath the top plate 12 is allowed to detect a vibration amplitude amplified depending on the amount of air bubbles generated by heating.

It is possible to determine whether an object to be heated is in a boiling state by utilizing the above principle. The principle is also applied to milk and oil, as well as water. Further, in the case where a foodstuff is put in the cooking vessel 11 in the course of cooking, for instance, the vibration amplitude may be increased because the foodstuff as a solid also reflects an ultrasonic wave, or conversely, the amplitude of the vibration waveform of the cooking vessel 11 itself may be decreased resulting from an increase in the weight of the object to be heated corresponding to the weight of the foodstuff itself. As a result, a change in the vibration waveform is observed depending on the location of the foodstuff in the cooking vessel 11. Accordingly, the above arrangement enables to detect whether a foodstuff has been put in the cooking vessel 11. Considering the above, only the maximum value of the output from the vibration waveform extracting section 15 extracted at a predetermined sampling time interval is retrieved for the following reason. Specifically, a change in the amplitude resulting from generation of air bubbles and the like at the time of boiling may likely to cause a change in the vibration primarily in a direction from the top plate 12 to the cooking vessel 11. A change in the vibration is small, if solely an average value of vibration is observed. Therefore, it is effective to monitor the maximum value of the output in order to detect a change in the vibration.

Next, the operations from Step S4 through Step S9 in FIG. 5 are described referring to FIG. 6 in detail. FIG. 6 is a graph showing a time-based change in vibration waveform to be obtained in the case where an ordinary cooking vessel is heated.

As described above, a vibration waveform is greatly affected by an air bubble generating condition. First, a case that an ordinary cooking vessel 11 is heated is described referring to FIG. 6. Observing boiling of an object to be heated in an ordinary cooking vessel, fine air bubbles are generated at a bottom surface of the cooking vessel 11 in an initial stage of heating (i.e. a partial boiling). As a result of the partial boiling, the amplitude of the vibration waveform is sharply increased from the initial stage of heating. Thereafter, the air bubbles are gradually detached from the bottom surface of the cooking vessel 11, and disappear in an upper region of the cooking vessel 11 where the atmospheric temperature is relatively low. Further, upon reaching the water surface in the cooking vessel 11, the air bubbles are burst on the water surface. The amplitude of the vibration waveform is lowered, as the air bubbles are detached from the bottom surface of the cooking vessel 11.

On the other hand, the amplitude of a vibration waveform at a low frequency of about 10 kHz or less corresponding to an audible frequency band is sharply increased from the point of time when burst of air bubbles is started. Thereafter, as the temperature is increased, large air bubbles are generated, and a vibration at a frequency of about 10 kHz or less is slightly reduced, and settled at a certain level.

On the other hand, in the first embodiment, ultrasonic vibrations are continued to be increased, as the amount of air bubbles generated by heating is increased. At the point of time when the object to be heated has completely boiled, and the amount of air bubbles generated by heating is maximum, the output of the vibration waveform is kept at a predetermined level. In other words, at the time when the amount of air bubbles generated by heating is maximum, the water temperature reaches almost the boiling point, and the vibration waveform output is increased and kept at a predetermined level. Accordingly, determination as to a boiling state can be made substantially without delay.

The above description has been made on a case that the ordinary cooking vessel 11 is heated. In the case where a fluorine-coated cooking vessel is heated, a time-based change in vibration waveform is great, as compared with the above case in a low frequency band of about 10 kHz or less corresponding to a conventional audible frequency band, and it is difficult to detect a change in the vibration waveform. Specifically, even after the partial boiling, air bubbles are hardly detached from a bottom surface of the cooking vessel 11, and the air bubbles grow at the bottom surface. Accordingly, a vibration waveform output is extremely small in the low frequency band of about 10 kHz or less. Then, immediately before the object to be heated is completely boiled, when air bubbles that have grown into large air bubbles at the bottom surface of the cooking vessel 11 are detached from the cooking vessel 11, and are burst on the water surface upon reaching, a slight output increase is observed. As described above, since a time-based change in vibration waveform is great in the fluorine-coated cooking vessel, as compared with the ordinary cooking vessel, the boiling determination criteria is different, and it is difficult to detect whether the object to be heated is in a boiling state.

In the first embodiment, a time-based change in vibration waveform in the fluorine-coated cooking vessel is substantially the same as shown in FIG. 6. Accordingly, it is possible to determine whether the object to be heated is in a boiling state in the fluorine-coated cooking vessel, as well as the ordinary cooking vessel. In the case where the fluorine-coated cooking vessel is used, however, as described above, air bubbles generated in the partial boiling are less likely to be detached from the bottom surface of the cooking vessel. Accordingly, lowering of the vibration waveform output may tend to be slightly delayed, or a degree in the lowering may tend to be decreased. Nevertheless, there is no significantly large difference in a time-based change in the entirety of the output waveform between the ordinary cooking vessel and the fluorine-coated cooking vessel, and it is possible to determine whether the object to be heated is in a boiling state in the fluorine-coated cooking vessel, as well as the ordinary cooking vessel.

As described above, in the operation of Step S6 in FIG. 5, the cooking vessel specifier 161 specifies the kind of the cooking vessel 11 by identifying the time-series waveform configuration as shown in FIG. 6 by pattern matching. It is also possible to determine whether the object to be heated is in a boiling state individually with respect to each of the kinds of the cooking vessels, based on a change in the waveform in the vicinity of the boiling point.

It should be noted that the time-series waveform configuration shown in FIG. 6 is not limited to the illustration shown in FIG. 6, but may be versatile depending on the kind of the object to be heated, inclusion/non-inclusion of a foodstuff, an intensity of heat to be applied by the induction heating section 13, or a like condition. Also, the time-series waveform differs depending on the kind of the cooking vessel, or a cooking recipe. Accordingly, storage contents may be learned and stored by utilizing waveform change patterns to be stored in the waveform change pattern database 163 with respect to each of the kinds of the cooking vessels. Thus, learning and storing the storage contents of the waveform change pattern database 163 depending on the kind of the cooking vessel, the cooking recipe, or a like condition enables to utilize the induction heating cooker as an automated cooking assistant apparatus.

As described in the foregoing referring to FIG. 4, in the case where there are prepared a plurality of cooking vessels 11 and a plurality of induction heating sections 13, an absolute value of a difference between a peak value and a bottom value of a vibration waveform of a frequency component having a frequency of about twice as large as each of the induction heating frequencies of the induction heating sections 13 is calculated, and the calculated absolute value is extracted as an amplitude of the frequency component having the frequency of about twice as large as the corresponding induction heating frequency. Then, each of the extracted amplitudes is compared with a predetermined value to determine a state of the object to be heated with respect to each of the induction heating sections 13.

Specifically, in the case where a plurality of cooking vessels 11 are simultaneously heated by a plurality of induction heating sections 13, there is a case that timings of starting heating may be different from each other, even if the induction heating frequencies of the induction heating sections 13 are identical to each other. In such an occasion, the cycles of the induction heating frequencies of the induction heating sections 13 may be displaced from each other, and vibration waveforms of the cooking vessels 11 may be detected to be displaced from each other. The arrangement of the embodiment enables to accurately detect a state of the object to be heated in each of the cooking vessels 11 by: calculating an absolute value of a difference between a peak value and a bottom value of a vibration waveform of a frequency component having a frequency of about twice as large as each of the induction heating frequencies of the induction heating sections 13; and extracting the calculated absolute value, as an amplitude of the frequency component having the frequency of about twice as large as the corresponding induction heating frequency, even in the case where the cooking vessels 11 are simultaneously heated by the induction heating sections 13.

As another method, the induction heating sections 13 may inductively heat the cooking vessels at induction heating frequencies different from each other, respectively; the vibration waveform extracting section 15 may extract an amplitude of a frequency component having a frequency of about twice as large as each of the induction heating frequencies of the induction heating sections 13 by subjecting the vibration waveform detected by the vibration detecting section 14 to a fast Fourier transformation; and the determining section 16 may determine the states of the objects to be heated individually with respect to each of the induction heating sections 13 by comparing each of the amplitudes extracted by the vibration waveform extracting section 15 with a predetermined value.

As described above, setting all the induction heating frequencies of the induction heating sections 13 to different values from each other enables to easily extract vibration waveforms from the induction heating sections 13 with use of the FFT shown in FIG. 3, while discriminating the vibration waveforms from each other, and identify the states of the objects to be heated in the individual cooking vessels 11.

Specifically, the induction heating sections 13 are operable to inductively heat the cooking vessels 11 at induction heating frequencies different from each other, respectively. Then, the vibration waveform extracting section 15 is operable to extract an amplitude of a frequency component having a frequency of about twice as large as each of the induction heating frequencies of the induction heating sections 13 by subjecting a vibration waveform to a fast Fourier transformation. Then, the determining section 16 is operable to determine the states of the objects to be heated individually with respect to each of the induction heating sections 13 by comparing each of the amplitudes extracted by the vibration waveform extracting section 15 with the predetermined value.

Accordingly, in the case where the cooking vessels 11 are simultaneously heated by the induction heating sections 13 at the induction heating frequencies different from each other, the amplitude of a frequency component having a frequency of about twice as large as each of the induction heating frequencies of the induction heating sections 13 is extracted by subjecting a vibration waveform to a fast Fourier transformation. This enables to accurately detect the states of the objects to be heated in the individual cooking vessels 11.

As yet another method, it is possible to install vibration detecting sections 14 individually with respect to each of the cooking vessels 11. Specifically, it is possible to cancel a vibration waveform from being transmitted from a specific one of the vibration detecting sections 14 to a cooking vessel 11 other than a targeted cooking vessel 11 corresponding to the specific vibration detecting section 14 by utilizing a time lag in a vibration waveform to be transmitted from the vibration detecting sections 14 installed at different positions to the corresponding cooking vessels 11 so as to extract solely a waveform of the targeted cooking vessel 11.

In this section, the operation in Step S10 in FIG. 5 is described in detail. In the case where the electric power supply to the induction heating section 13 is maintained at a certain level after air bubble generation is maximized, the air bubbles and the like may likely to overflow. Although it depends on the volume of an object to be heated in the cooking vessel 11, in the case where water of a volume of 80% or more relative to the volume of the cooking vessel 11 is put in the cooking vessel 11, it is often the case that the boiling water may be split out of the cooking vessel 11 by burst of large air bubbles at the water surface by boiling. For instance, in the case where milk is put in the cooking vessel 11, or noodles or a like foodstuff is boiled, air bubbles generated by heating are accumulated on the water surface without bursting, and the air bubbles are continued to grow in the cooking vessel 11, thereby causing overflow of air bubbles and the like.

In view of the above, after air bubble generation i.e. boiling has been detected, the heating controlling section 17 is operable to reduce the amount of electric power to be supplied to the induction heating section 13. In this case, unduly lowering the electric power or turning off the power source may terminate the boiling. Under the above circumstances, if the user misjudges that the object to be heated has not been boiled, the user may try to boil the object to be heated again, despite that the object to be heated was already boiled. In view of the above, it is necessary to control the electric power output in such a manner that the vibration amplitude is maintained in a temperature range close to the boiling point, while measuring the vibration amplitude. As a result of the electric power control, a proper cooking support can be provided by continuing the boiling or keeping the temperature of the cooking vessel in a certain temperature range, as well as preventing overflow of air bubbles and the like.

Figure 7:
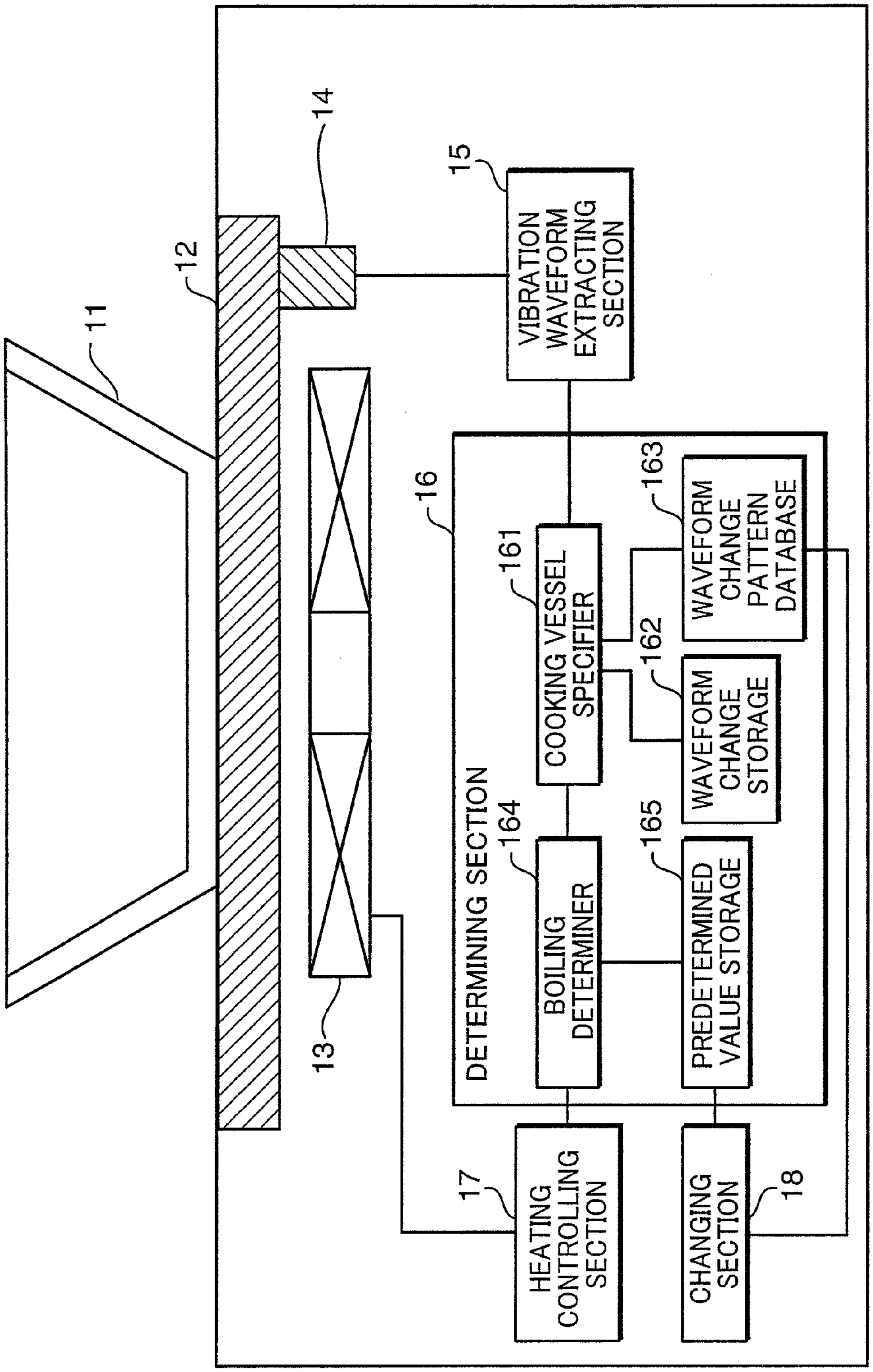
FIG. 7 is a diagram showing an arrangement of an induction heating cooker as a modification of the first embodiment.

Next, an induction heating cooker as a modification of the first embodiment is described. FIG. 7 is a diagram showing an arrangement of the induction heating cooker as the modification of the first embodiment. The induction heating cooker shown in FIG. 7 further includes a changing section 18. The changing section 18 changes at least one of the predetermined value stored in the predetermined value storage 165 and the waveform change pattern stored in the waveform change pattern database 163, depending on at least one of a state of the object to be heated, and a controlled state of the heating controlling section 17.

Figure 8:
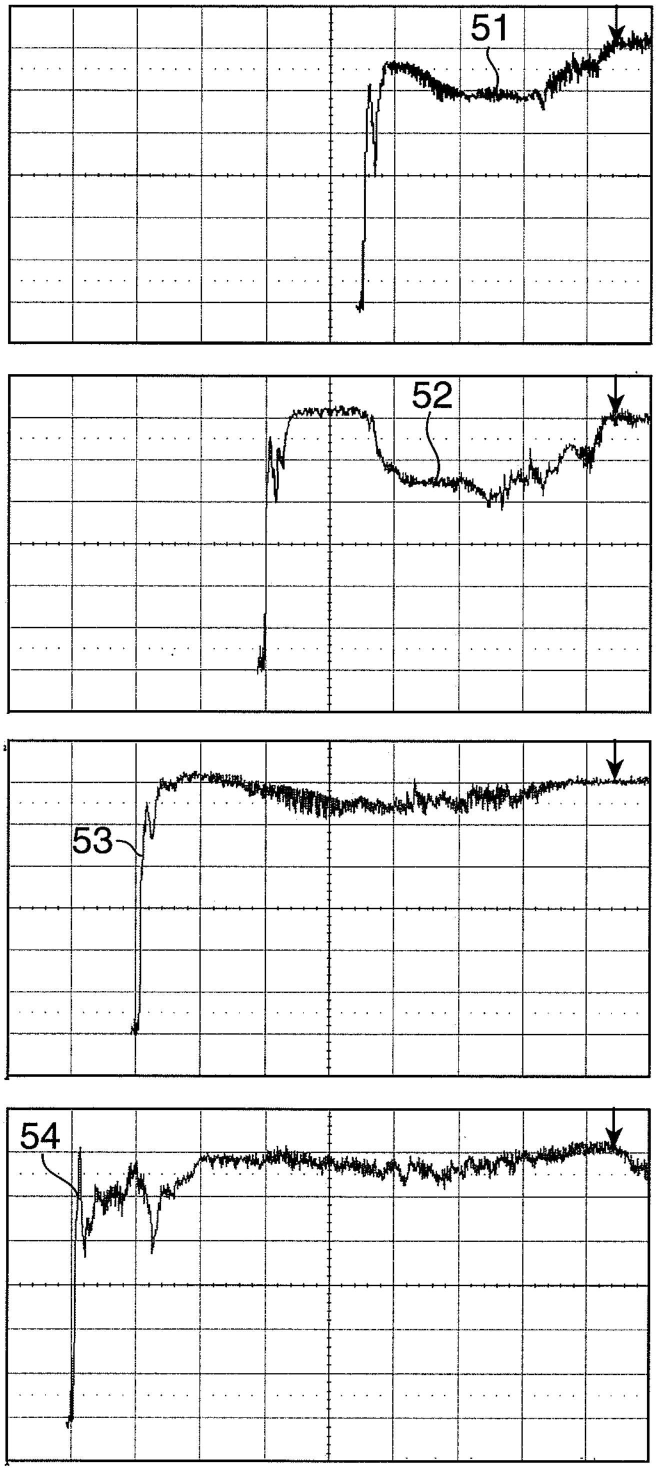
FIG. 8 is a diagram showing an example of a waveform change pattern corresponding to a fluorine-coated cooking vessel having a thick bottom portion.
Figure 9:
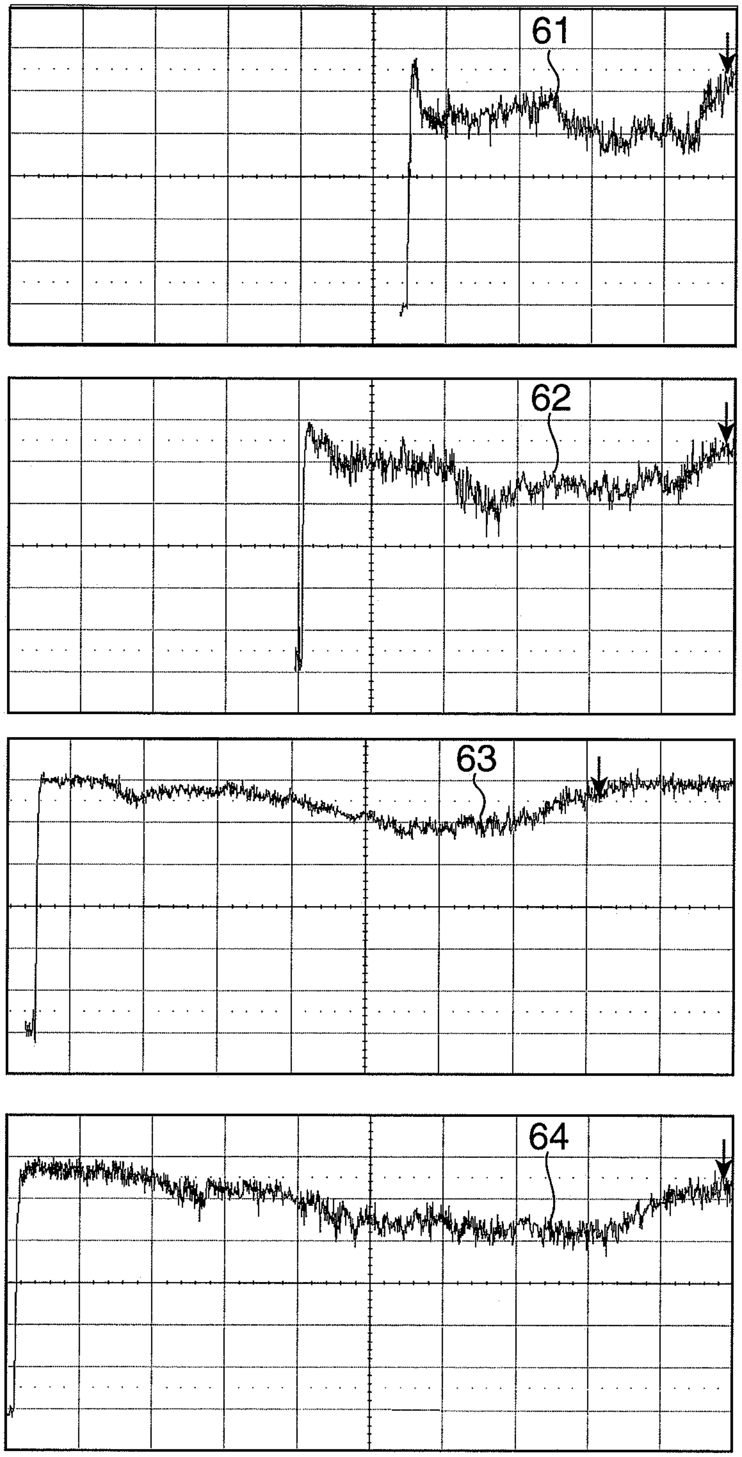
FIG. 9 is a diagram showing an example of a waveform change pattern corresponding to a stainless cooking vessel having a thick bottom portion.
Figure 10:
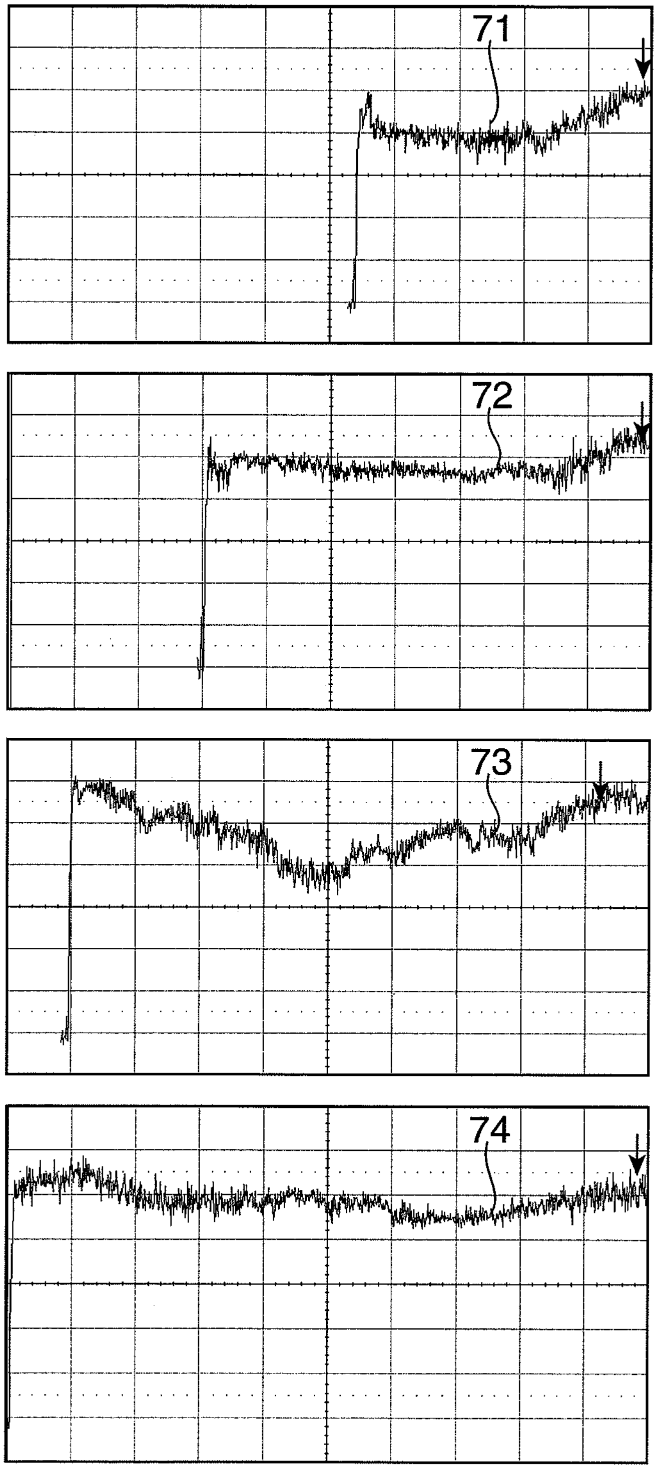
FIG. 10 is a diagram showing an example of a waveform change pattern corresponding to a stainless cooking vessel having a thin bottom portion.

FIG. 8 is a diagram showing an example of a waveform change pattern corresponding to a fluorine-coated cooking vessel having a thick bottom portion. FIG. 9 is a diagram showing an example of a waveform change pattern corresponding to a stainless cooking vessel having a thick bottom portion. FIG. 10 is a diagram showing an example of a waveform change pattern corresponding to a stainless cooking vessel having a thin bottom portion. In FIGS. 8 through 10, waveform change patterns 51, 61, and 71 are waveform change patterns to be obtained in the case where water of 1,000 CC is boiled. Waveform change patterns 52, 62, and 72 are waveform change patterns to be obtained in the case where water of 1,500 CC is boiled. Waveform change patterns 53, 63, and 73 are waveform change patterns to be obtained in the case where water of 2,000 CC is boiled. Waveform change patterns 54, 64, and 74 are waveform change patterns to be obtained in the case where water of 2,500 CC is boiled. The arrows in FIGS. 8 through 10 indicate a boiling point.

As shown in FIGS. 8 through 10, as the amount of water in the cooking vessel is increased, the output value in an initial stage of heating tends to be increased, the waveform tends to expand in the time axis direction as a whole, and the increase rate in the output value at the time of boiling tends to be decreased. In the case where a fluorine-coated cooking vessel is used, the output value in an intermediate stage of heating tends to be increased, as compared with a case of using a stainless cooking vessel. In the case where the shape (i.e. a thickness) of a bottom portion of a cooking vessel is different among the stainless cooking vessels, the output value at the time of boiling tends to be varied, and the waveform change pattern tends to be varied.

Although not illustrated, the output value tends to be increased, in the case where a foodstuff is put in a cooking vessel being heated. Further, in the case where a low-level heating control is performed, the output value tends to be decreased, and the waveform change pattern tends to expand in the time axis direction.

In the case where a fluorine-coated cooking vessel with a thick bottom portion is used, the predetermined value to be used in boiling determination is −20 dB. In the case where a stainless cooking vessel with a thick bottom portion is used, the predetermined value to be used in boiling determination is −23 dB. In the case where a stainless cooking vessel with a thin bottom portion is used, the predetermined value to be used in boiling determination is −26 dB. In this way, the predetermined value is varied depending on the kind or the shape of the cooking vessel.

As described above, at least one of the predetermined value, and the waveform change pattern stored in the waveform change pattern database 163 is changed, depending on at least one of the state of the object to be heated determined by the determining section 16, and the controlled state of the induction heating section 13 to be controlled by the heating controlling section 17. This enables to optimally detect the state of the object to be heated, and the kind of the cooking vessel, depending on a heating pattern which is varied depending on the state of the object to be heated, and the controlled state of the induction heating section 13. As a result of the control, the boiling states of the objects to be heated can be optimally detected individually depending on a heating pattern which is varied depending on a status as to whether the object to be heated is in a boiling state, a status as to whether a foodstuff has been put in, the kind of the cooking vessel, and a cooking recipe. This arrangement enables to avoid cooking failure, and provide an optimum cooking advice.

As described above, the induction heating cooker in the first embodiment is advantageous in avoiding cooking failure, and providing an optimum cooking advice depending on a heating pattern which is varied depending on the kind of the cooking vessel or a cooking recipe, concerning a judgment as to whether a boiling operation is to be continued, a temperature keeping operation is to be continued, and a foodstuff has been put in, as well as preventing overflow of air bubbles and the like.

Figure 11:
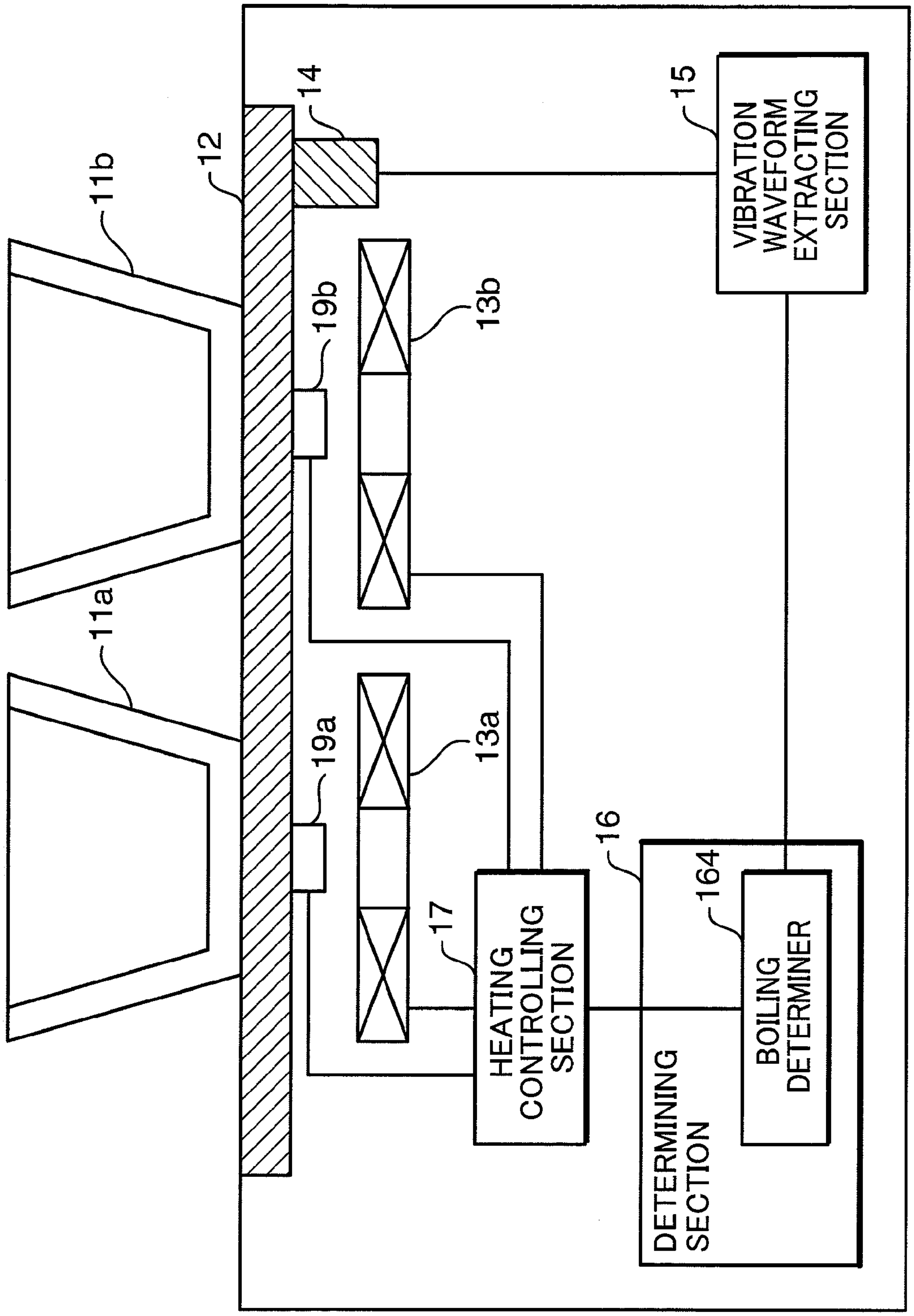
FIG. 11 is a diagram showing an arrangement of an induction heating cooker in accordance with a second embodiment of the invention.

In this section, an induction heating cooker in accordance with a second embodiment of the invention is described. FIG. 11 is a diagram showing an arrangement of the induction heating cooker in the second embodiment. Elements in the second embodiment substantially identical or equivalent to those in the first embodiment are indicated with the same reference numerals, and description thereof is omitted herein.

The induction heating cooker shown in FIG. 11 includes a top plate 12, a first induction heating section 13*a*, a second induction heating section 13*b*, a vibration detecting section 14, a vibration waveform extracting section 15, a determining section 16, a heating controlling section 17, a first temperature detecting section 19*a*, and a second temperature detecting section 19*b*.

The first induction heating section 13*a* inductively heats a first cooking vessel 11*a*, and the second induction heating section 13*b* inductively heats a second cooking vessel 11*b*. The induction heating frequency of the first induction heating section 13*a* is identical to the induction heating frequency of the second induction heating section 13*b*. The first temperature detecting section 19*a* is constituted of e.g. a thermistor, and detects a temperature of a bottom surface of the first cooking vessel 11*a*. The second temperature detecting section 19*b* is constituted of e.g. a thermistor, and detects a temperature of a bottom surface of the second cooking vessel 11*b*. The first temperature detecting section 19*a* and the second cooking vessel 11*b* are provided in a conventional induction heating cooker to adjust an oil temperature for use in a fry cooking or a like cooking.

The heating controlling section 17 is operable to lower an induction heating output of one of the first and the second induction heating sections 13*a* and 13*b*, based on temperatures of the first and the second cooking vessels 11*a* and 11*b* respectively detected by the first and the second temperature detecting sections 19*a* and 19*b*. The determining section 16 includes a boiling determiner 164. The boiling determiner 164 determines states of objects to be heated individually with respect to each of the first and the second induction heating sections 13*a* and 13*b* by detecting a change in a vibration waveform extracted by the vibration waveform extracting section 15.

Specifically, the heating controlling section 17 prioritizes lowering the induction heating output of one of the first and the second induction heating sections 13*a* and 13*b*, whose temperature is detected to be higher, as a result of detection by the first and the second temperature detecting sections 19*a* and 19*b*. For instance, the heating controlling section 17 lowers the induction heating output of the first induction heating section 13*a*, in the case where the temperature of the first cooking vessel 11*a* detected by the first temperature detecting section 19*a* is higher than the temperature of the second cooking vessel 11*b* detected by the second temperature detecting section 19*b*.

In this embodiment, the heating controlling section 17 lowers the induction heating output of the induction heating section corresponding to the cooking vessel whose temperature is detected to be higher. The invention is not specifically limited to the above. Alternatively, the heating controlling section 17 may prioritize lowering the induction heating output of the induction heating section corresponding to the cooking vessel whose temperature increase rate is detected to be higher.

Figure 12:
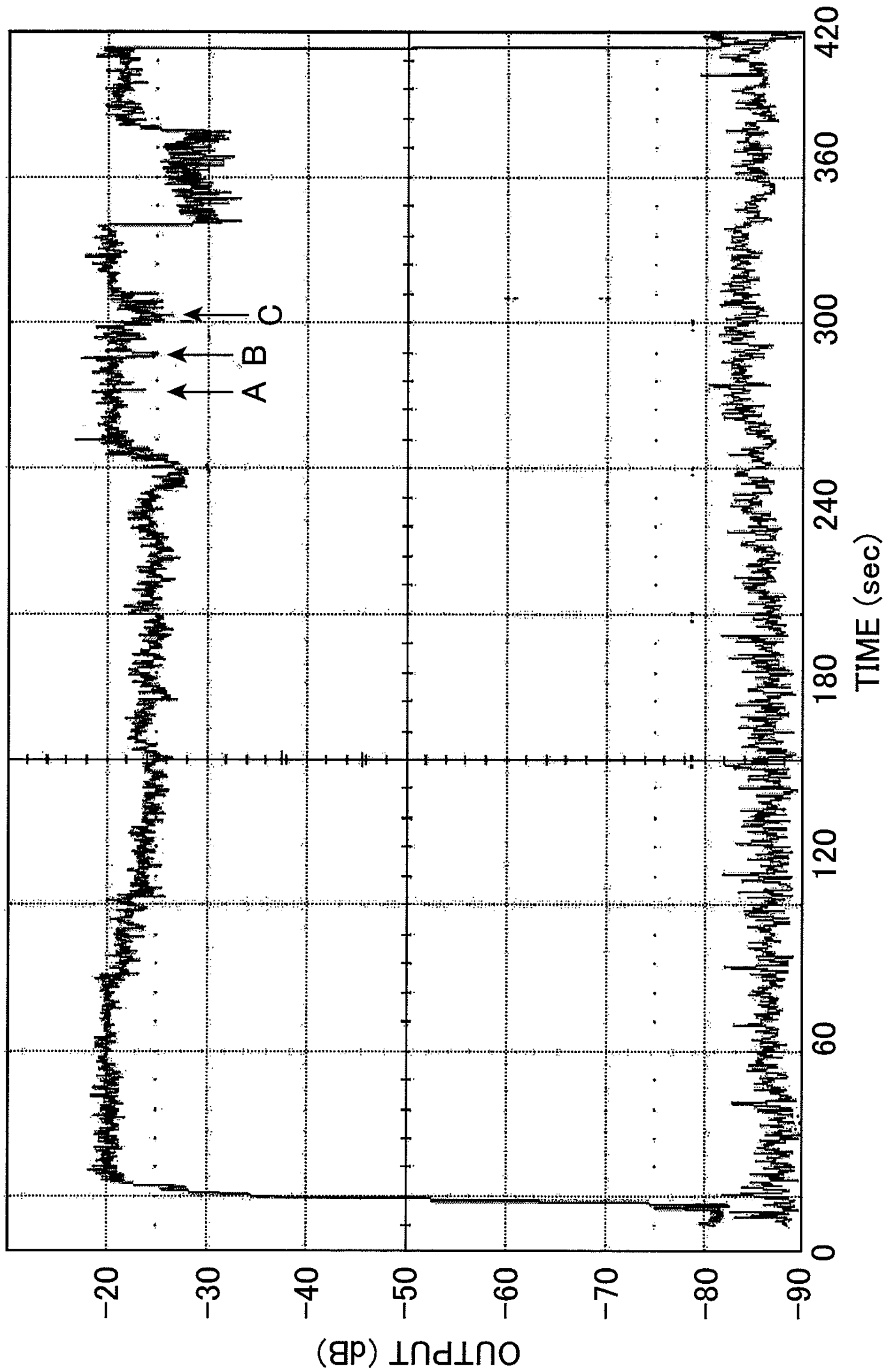
FIG. 12 is a diagram showing an example of a vibration waveform to be detected in the case where a first induction heating section and a second induction heating section are activated.

FIG. 12 is a diagram showing an example of a vibration waveform to be detected in the case where the first and the second induction heating sections 13*a* and 13*b* are activated. A time duration indicated by the arrow A in FIG. 12 corresponds to a period during which the induction heating output of the induction heating section corresponding to a cooking vessel, where a boiling state is not detected, is lowered. A time duration indicated by the arrow B corresponds to a period from the point of time when the induction heating output of the induction heating section corresponding to a boiling cooking vessel is lowered to the point of time when the level of the induction heating output is instantaneously returned to the level before lowering. A time duration indicated by the arrow C corresponds to a period from the point of time when the induction heating output of the induction heating section corresponding to a boiling cooking vessel is lowered, followed by maintaining the lowering state for 2.5 sec, to the point of time when the level of the induction heating output is returned to the level before lowering.

As shown in FIG. 12, a waveform change is hardly observed during the period A, and a waveform change is negligibly small during the period B. On the other hand, a significant waveform change can be confirmed during the period C. Thus, determination as to a boiling state can be securely made by: lowering the induction heating output of the induction heating section corresponding to a boiling cooking vessel; maintaining the lowering state for 2.5 sec.; and returning the level of the induction heating output to the level before lowering.

Alternatively, an elimination method may be employed to specify the induction heating section corresponding to a boiling cooking vessel by: lowering the induction heating output of the induction heating section corresponding to a cooking vessel where a boiling state is not detected; and confirming that the vibration waveform is not changed. In the modification, the heating controlling section 17 prioritizes lowering the induction heating output of one of the first and the second induction heating sections 13*a* and 13*b* corresponding to the first cooking vessel or the second cooking vessel, whose temperature is detected to be lower, as a result of temperature detection by the first and the second temperature detecting sections 19*a* and 19*b*. In the case where no change is detected in the vibration waveform, the boiling determiner 164 determines that the object to be heated in the cooking vessel heated by the other one of the first and the second induction heating sections 13*a* and 13*b* is in a boiling state.

In this embodiment, the induction heating output of one of the first and the second induction heating sections 13*a* and 13*b* is lowered. The invention is not limited to the above. Alternatively, the induction heating frequency of one of the first and the second induction heating sections 13*a* and 13*b* may be lowered.

As described above, the first and the second induction heating sections 13*a* and 13*b* are operable to inductively heat the first and the second cooking vessels 11*a* and 11*b*, respectively. The first and the second temperature detecting sections 19*a* and 19*b* are operable to detect the temperatures of the first and the second cooking vessels 11*a* and 11*b*, respectively. Then, the heating controlling section 17 is operable to lower the induction heating output of one of the first and the second induction heating sections 13*a* and 13*b*, based on the temperatures of the first and the second cooking vessels 11*a* and 11*b* detected by the first and the second temperature detecting sections 19*a* and 19*b*, respectively. Subsequently, the determining section 16 is operable to determine the states of the objects to be heated individually with respect to each of the first and the second induction heating sections 13*a* and 13*b* by detecting a change in the vibration waveform extracted by the vibration waveform extracting section 15. This enables to determine the states of the objects to be heated individually with respect to each of the first and the second induction heating sections 13*a* and 13*b*, even if the induction heating frequencies of the first and the second induction heating sections 13*a* and 13*b* are identical to each other.

Figure 13:
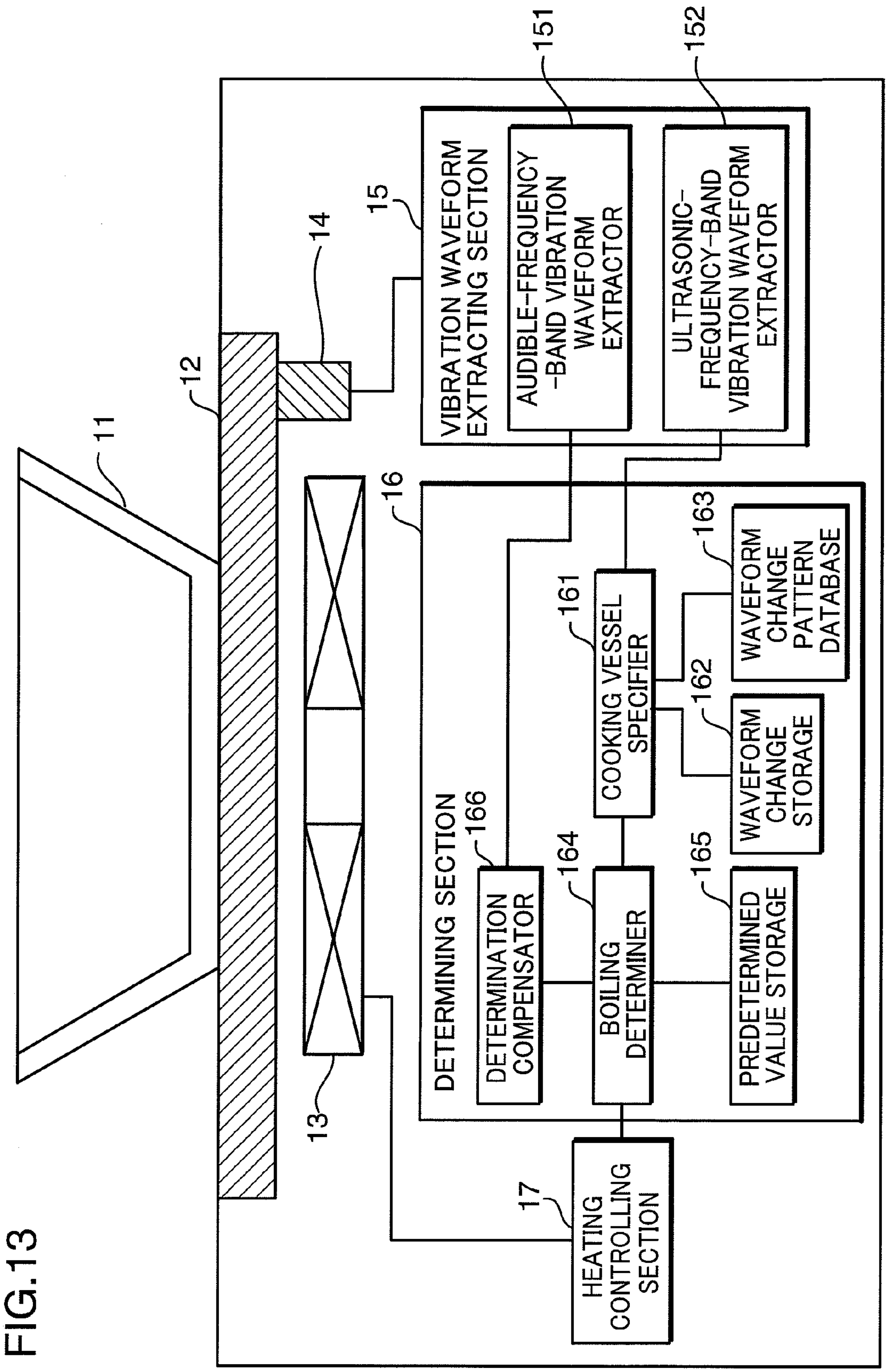
FIG. 13 is a diagram showing an arrangement of an induction heating cooker in accordance with a third embodiment of the invention.

In the following, an induction heating cooker in accordance with a third embodiment of the invention is described. FIG. 13 is a diagram showing an arrangement of the induction heating cooker in the third embodiment. Elements in the third embodiment substantially identical or equivalent to those in the first embodiment are indicated with the same reference numerals, and description thereof is omitted herein. The induction heating cooker shown in FIG. 13 includes a top plate 12, an induction heating section 13, a vibration detecting section 14, a vibration waveform extracting section 15, a determining section 16, and a heating controlling section 17.

The vibration detecting section 14 detects a vibration of a cooking vessel 11 in an ultrasonic frequency band via the top plate 12, and detects a vibration of the cooking vessel 11 in an audible frequency band.

The vibration waveform extracting section 15 includes an audible-frequency-band vibration waveform extractor 151 and an ultrasonic-frequency-band vibration waveform extractor 152. The ultrasonic-frequency-band vibration waveform extractor 152 extracts a first vibration waveform of a frequency component having a frequency of about twice as large as the induction heating frequency, based on a vibration waveform in an ultrasonic frequency band detected by the vibration detecting section 14. The audible-frequency-band vibration waveform extractor 151 extracts a second vibration waveform in an audible frequency band detected by the vibration detecting section 14. In this embodiment, the audible-frequency-band vibration waveform extractor 151 extracts the second waveform frequency in an audible frequency band from e.g. 10 to 20 kHz.

The determining section 16 determines whether the object to be heated is in a boiling state, based on the first vibration waveform in the ultrasonic frequency band extracted by the ultrasonic-frequency-band vibration waveform extractor 152, and compensates for the determination as to the boiling state, based on the second vibration waveform in the audible frequency band extracted by the audible-frequency-band vibration waveform extractor 151.

Specifically, the determining section 16 further includes a determination compensator 166. The determination compensator 166 judges whether the output in the second vibration waveform in the audible frequency band extracted by the audible-frequency-band vibration waveform extractor 151 has been increased, in the case where the boiling determiner 164 has determined that the object to be heated in the cooking vessel is in a boiling state. If it is judged that the output in the second vibration waveform in the audible frequency band has been increased, the determination compensator 166 judges that the determination result by the boiling determiner 164 is correct, and that the object to be heated in the cooking vessel is in a boiling state. If, on the other hand, it is judged that the output in the second vibration waveform in the audible frequency band has not been increased, the determination compensator 166 judges that the determination result by the boiling determiner 164 is incorrect, and that the object to be heated in the cooking vessel is not in a boiling state.

The heating controlling section 17 controls the electric power output of the induction heating section 13, in the case where both of the judgment results by the boiling determiner 164 and the determination compensator 166 indicate that the object to be heated is in a boiling state.

Figure 14:
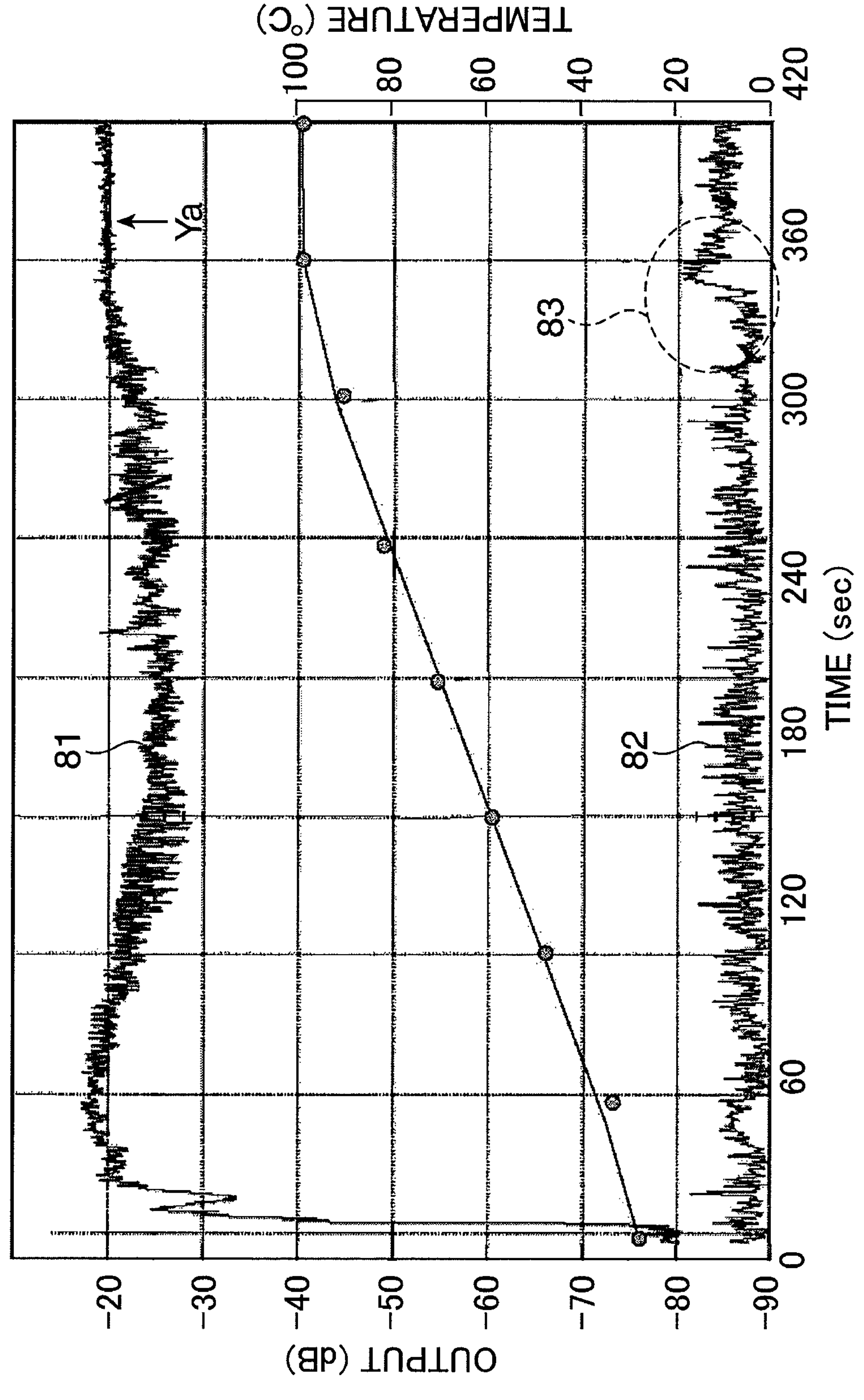
FIG. 14 is a diagram showing an example of a time-based change in vibration waveform in an ultrasonic frequency band, a vibration waveform in an audible frequency band, and a temperature of an object to be heated in a fluorine-coated cooking vessel, in the case where the fluorine-coated cooking vessel is heated.

FIG. 14 is a diagram showing an example of a time-based change in a vibration waveform in the ultrasonic frequency band, a vibration waveform in the audible frequency band, and a temperature of an object to be heated in a fluorine-coated cooking vessel, in the case where the fluorine-coated cooking vessel is heated. Referring to FIG. 14, a vibration waveform 81 indicates a time-based change in the amplitude of a frequency component having a frequency of 46 kHz in the ultrasonic frequency band, and a vibration waveform 82 indicates a time-based change in the amplitude of a frequency component in a frequency band from 10 to 20 kHz corresponding to the audible frequency band.

A time duration indicated by the arrow Ya in FIG. 14 corresponds to the point of time when the boiling determiner 164 has determined that the object to be heated is in a boiling state. As shown by a broken-line circle 83 in FIG. 14, even if a fluorine-coated cooking vessel is used, there is a case that the output of the vibration waveform may be increased at the time of boiling. In view of this, it is possible to determine whether the object to be heated is in a boiling state based on the vibration waveform in the ultrasonic frequency band, and compensate for the determination result based on the vibration waveform in the audible frequency band.

As described above, the vibration detecting section 14 is operable to detect a vibration of the cooking vessel 11 in the ultrasonic frequency band via the top plate 12, and detect a vibration of the cooking vessel 11 in the audible frequency band. Then, the vibration waveform extracting section 15 is operable to extract the first vibration waveform of a frequency component having a frequency of about twice as large as the induction heating frequency, from the vibration waveform in the ultrasonic frequency band detected by the vibration detecting section 14; and extract the second vibration waveform in the audible frequency band detected by the vibration detecting section 14. Subsequently, the determining section 16 is operable to determine whether the object to be heated is in a boiling state, based on the first vibration waveform extracted by the vibration waveform extracting section 15; and compensate for the determination as to the boiling state, based on a change in the second vibration waveform extracted by the vibration waveform extracting section 15. Thus, the determination as to the boiling state based on the vibration waveform in the ultrasonic frequency band is compensated for based on the change in the vibration waveform in the audible frequency band. This enables to enhance precision in determination as to a boiling state.

Figure 15:
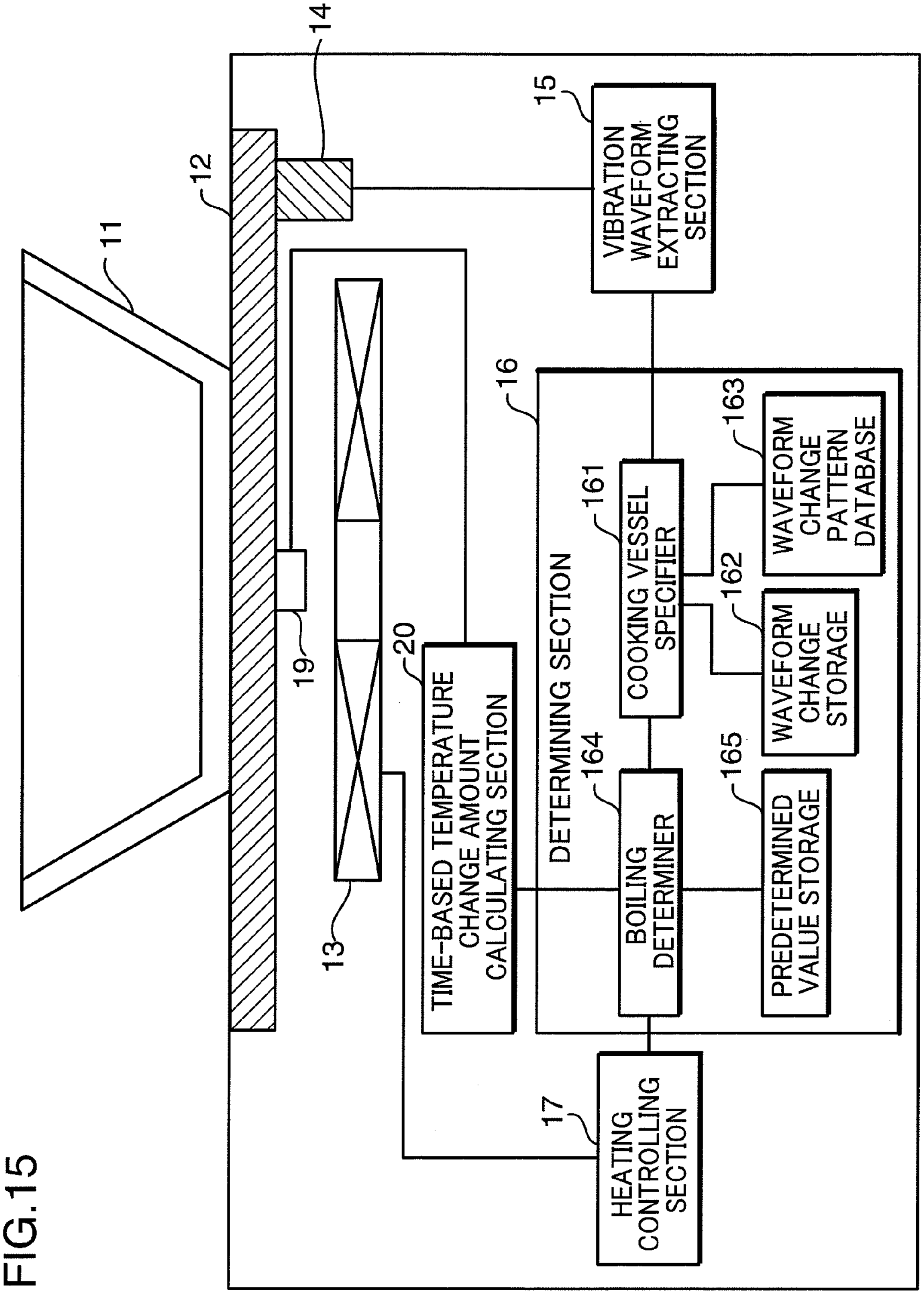
FIG. 15 is a diagram showing an arrangement of an induction heating cooker in accordance with a fourth embodiment of the invention.

In the following, an induction heating cooker in accordance with a fourth embodiment of the invention is described. FIG. 15 is a diagram showing the induction heating cooker in the fourth embodiment. Elements in the fourth embodiment substantially identical or equivalent to those in the first embodiment are indicated with the same reference numerals, and description thereof is omitted herein. The induction heating cooker shown in FIG. 15 includes a top plate 12, an induction heating section 13, a vibration detecting section 14, a vibration waveform extracting section 15, a determining section 16, a heating controlling section 17, a temperature detecting section 19, and a time-based temperature change amount calculating section 20.

The temperature detecting section 19 is constituted of e.g. a thermistor, and detects a temperature of a bottom surface of a cooking vessel 11. The time-based temperature change amount calculating section 20 calculates a time-based change amount of the temperature of the cooking vessel 11 detected by the temperature detecting section 19.

A boiling determiner 164 determines that the object to be heated is not in a boiling state, in the case where a time-based change amount calculated by the time-based temperature change amount calculating section 20 is larger than a predetermined value or smaller than 0.

An output of a vibration waveform to be extracted by the vibration waveform extracting section 15 tends to be increased in an initial stage of heating, temporarily decreased in an intermediate stage of heating, and then increased again at the time of boiling. Accordingly, in the initial stage of heating, the output may exceed a predetermined value to be used in boiling determination, and the object to be heated may be misjudged to be in a boiling state. The above drawback can be eliminated by calculating a time-base change amount of the temperature to be detected by the temperature detecting section 19, in a case where a cooking vessel containing boiled water is to be placed on another induction heating section for re-boiling, and a case where another cooking vessel is to be placed on the induction heating section which has been used for boiling water, and heated. In the following, operations to be performed by the induction heating cooker in the above two cases are described.

Figure 16:
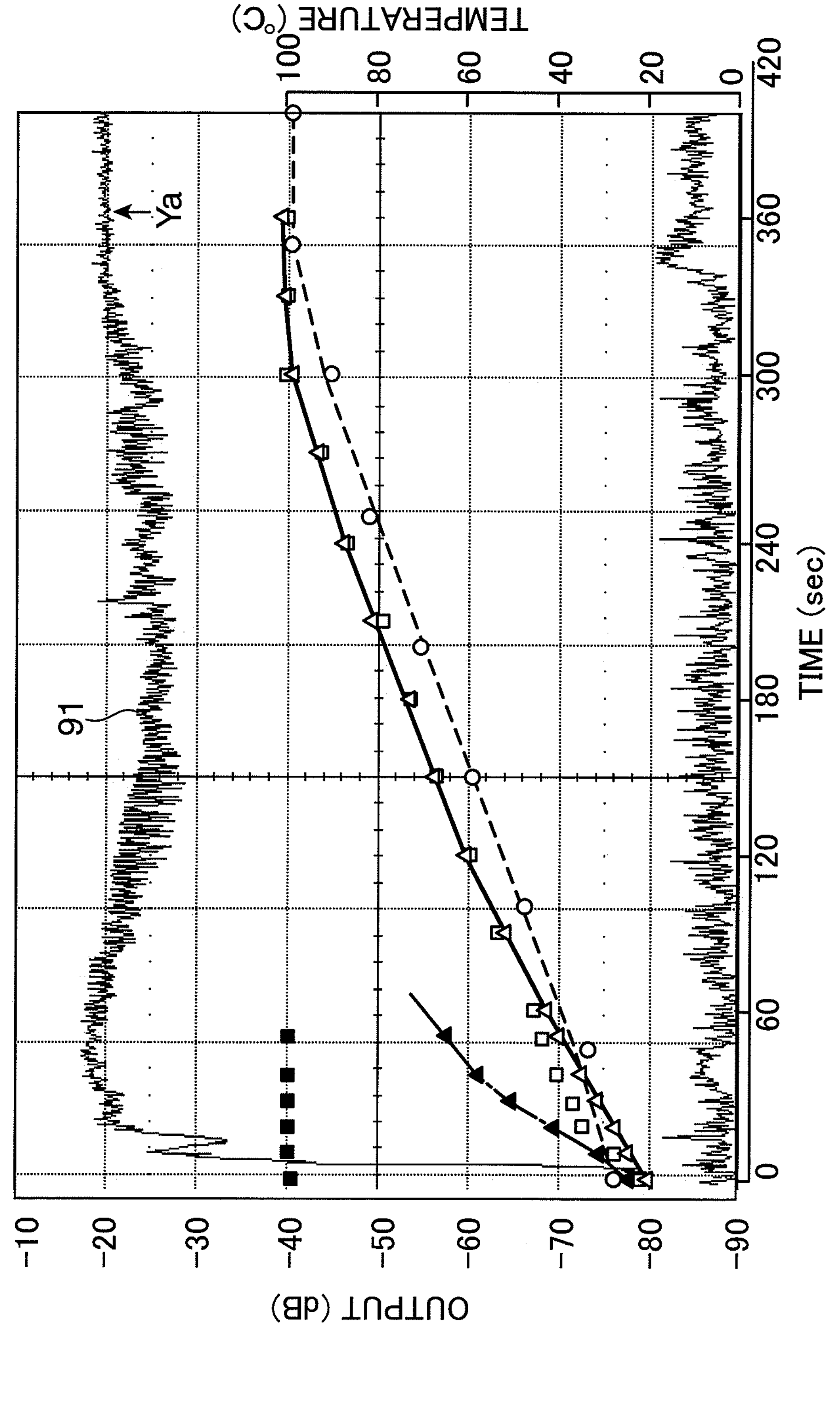
FIG. 16 is a diagram for describing an operation to be performed by the induction heating cooker, in the case where a cooking vessel containing boiled water is placed on another induction heating section for re-boiling.

FIG. 16 is a diagram for describing an operation to be performed by the induction heating cooker in the case where a cooking vessel containing boiled water is to be placed on another induction heating section for re-boiling. FIG. 16 shows an example of a vibration waveform in an ultrasonic frequency band, a vibration waveform in an audible frequency band, and a time-based change in temperature of an object to be heated in a cooking vessel; a time-based change in temperature to be detected by the temperature detecting section; and a time-based change in temperature of a bottom surface of the cooking vessel.

In FIG. 16, a vibration waveform 91 indicates a time-based change in the amplitude of a frequency component having a frequency of 46 kHz in the ultrasonic frequency band. A time duration indicated by the arrow Ya in FIG. 16 corresponds to the point of time when the boiling determiner 164 determines that the object to be heated is in a boiling state.

A curve connecting the hollow circles in FIG. 16 indicates a time-based change in the temperature of water in the cooking vessel 11. A curve connecting the hollow triangles in FIG. 16 indicates a time-based change in the temperature to be detected by the temperature detecting section 19 in the case where water is to be boiled. A curve connecting the hollow rectangles in FIG. 16 indicates a time-based change in the temperature of a bottom surface of the cooking vessel 11 in the case where water is to be boiled. A curve connecting the solid triangles in FIG. 16 indicates a time-based change in the temperature to be detected by the temperature detecting section 19 in the case where boiled water is to be boiled again. A curve connecting the solid rectangles in FIG. 16 indicates a time-based change in the temperature of the bottom surface of the cooking vessel 11 in the case where boiled water is to be boiled again.

As shown in FIG. 16, in the case where water is to be boiled for the first time, a time-based change in the temperature to be detected by the temperature detecting section 19, and a time-based change in the temperature of the bottom surface of the cooking vessel 11 are substantially identical to a time-based change in the temperature of water in the cooking vessel 11. On the other hand, in the case where the cooking vessel containing boiled water is to be placed on another induction heating section for re-boiling, a time-based change in the temperature to be detected by the temperature detecting section 19 is increased in a short time by heat transfer from the cooking vessel 11 to the object to be heated, although the time-based change in temperature of the bottom surface of the cooking vessel 11 is kept substantially around 100° C. with time.

In the above condition, in the case it is determined that the object to be heated in the cooking vessel is in a boiling state, the boiling determiner 164 judges whether the time-based change amount calculated by the time-based temperature change amount calculating section 20 is larger than a predetermined value. If it is judged that the time-based change amount is larger than the predetermined value, the boiling determiner 164 determines that the object to be heated in the cooking vessel 11 is not in a boiling state. If, on the other hand, it is judged that the time-based change amount is equal to or smaller than the predetermined value, the boiling determiner 164 determines that the object to be heated in the cooking vessel 11 is in a boiling state.

The time-based change amount is varied depending on the kind of the cooking vessel. In view of this, the boiling determiner 164 may pre-store the predetermined value to be used in making a judgment on the time-based change amount by the number corresponding to the number of the kinds of the cooking vessels; read out a predetermined value corresponding to a cooking vessel specified by a cooking vessel specifier 161; and compare the readout predetermined value with a time-based change amount calculated by the time-based temperature change amount calculating section 20. The time-based change amount is also varied depending on the quantity of the object to be heated. In view of this, the boiling determiner 164 may pre-store the predetermined value to be used in making a judgment on the time-based change amount by the number corresponding to the number of quantities of the objects to be heated; read out a predetermined value corresponding to a quantity of the object to be heated; and compare the readout predetermined value with a time-based change amount calculated by the time-based temperature change amount calculating section 20.

Figure 17:
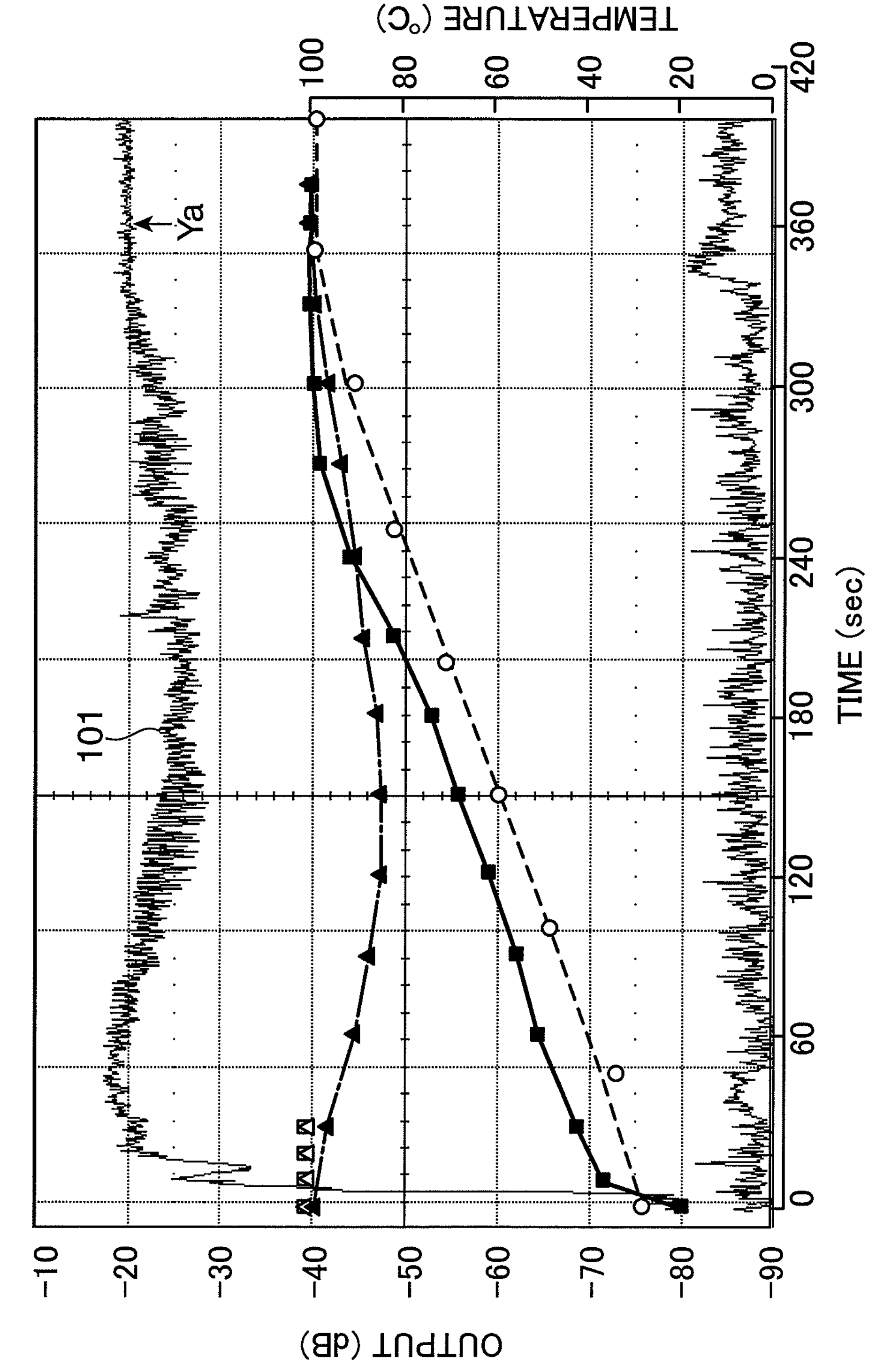
FIG. 17 is a diagram for describing an operation to be performed by the induction heating cooker, in the case where another cooking vessel is placed on an induction heating section which has been used for boiling, and heated.

FIG. 17 is a diagram for describing an operation to be performed by the induction heating cooker in the case where another cooking vessel is to be placed on an induction heating section used for boiling, and heated. FIG. 17 shows an example of a vibration waveform in an ultrasonic frequency band, a vibration waveform in an audible frequency band, and a time-based change in temperature of an object to be heated in a cooking vessel; a time-based change in temperature to be detected by the temperature detecting section; and a time-based change in temperature of a bottom surface of the cooking vessel.

In FIG. 17, a vibration waveform 101 indicates a time-based change in the amplitude of a frequency component having a frequency of 46 kHz in the ultrasonic frequency band. A time duration indicated by the arrow Ya in FIG. 17 corresponds to the point of time when the boiling determiner 164 determines that the object to be heated is in a boiling state.

A curve connecting the hollow circles in FIG. 17 indicates a time-based change in the temperature of water in a cooking vessel 11. A curve connecting the hollow triangles in FIG. 17 indicates a time-based change in the temperature to be detected by the temperature detecting section 19 in the case where the cooking vessel 11 is to be heated again for boiling immediately after the boiling. A curve connecting the hollow rectangles in FIG. 17 indicates a time-based change in the temperature of a bottom surface of the cooking vessel 11 in the case where the cooking vessel 11 is to be heated again for boiling immediately after the boiling. A curve connecting the solid triangles in FIG. 17 indicates a time-based change in the temperature to be detected by the temperature detecting section 19 in the case where another cooking vessel is to be heated for boiling immediately after the boiling in the previously-used cooking vessel. A curve connecting the solid rectangles in FIG. 17 indicates a time-based change in the temperature of the bottom surface of the cooking vessel 11 in the case where the another cooking vessel is to be heated for boiling immediately after the boiling in the previously-used cooking vessel.

As shown in FIG. 17, in the case a cooking vessel is to be heated again for boiling immediately after the boiling in the cooking vessel, the time-based change in temperature to be detected by the temperature detecting section 19, and the time-based change in temperature of the bottom surface of the cooking vessel 11 are kept substantially around 100° C. with time. On the other hand, in the case where another cooking vessel is to be heated again for boiling immediately after the boiling in the previously-used cooking vessel, the time-based change in temperature to be detected by the temperature detecting section 19 is temporarily decreased with time by heat transfer to the newly-used cooking vessel, although a time-based change in the temperature of the bottom surface of the cooking vessel 11 substantially follows a time-based change in the temperature of water in the cooking vessel.

In the above condition, in the case it is determined that the object to be heated in the cooking vessel is in a boiling state, the boiling determiner 164 judges whether the time-based change amount calculated by the time-based temperature change amount calculating section 20 is smaller than 0. If it is judged that the time-based change amount is smaller than 0, the boiling determiner 164 determines that the object to be heated in the cooking vessel 11 is not in a boiling state. If, on the other hand, it is judged that the time-based change amount is equal to or larger than 0, the boiling determiner 164 determines that the object to be heated in the cooking vessel 11 is in a boiling state.

As described above, the temperature detecting section 19 is operable to detect a temperature of the cooking vessel 11. The time-based temperature change amount calculating section 20 is operable to calculate a time-based change amount of the temperature of the cooking vessel 11 detected by the temperature detecting section 19. Then, the boiling determiner 164 is operable to judge whether the time-based change amount calculated by the time-based temperature change amount calculating section 20 is larger than the predetermined value or smaller than 0. If it is judged that the time-based change amount calculated by the time-based temperature change amount calculating section 20 is larger than the predetermined value, or smaller than 0, the boiling determiner 164 determines that the object to be heated is not in a boiling state.

In the initial stage of heating, the vibration waveform of a frequency component having a frequency of about twice as large as the induction heating frequency may be temporarily increased, and as a result, the object to be heated is misjudged to be in a boiling state. In this embodiment, judging whether the time-based change amount calculated by the time-based temperature change amount calculating section 20 is larger than the predetermined value or smaller than 0 enables to prevent an erroneous detection on a boiling state in the initial stage of heating.

Figure 18:
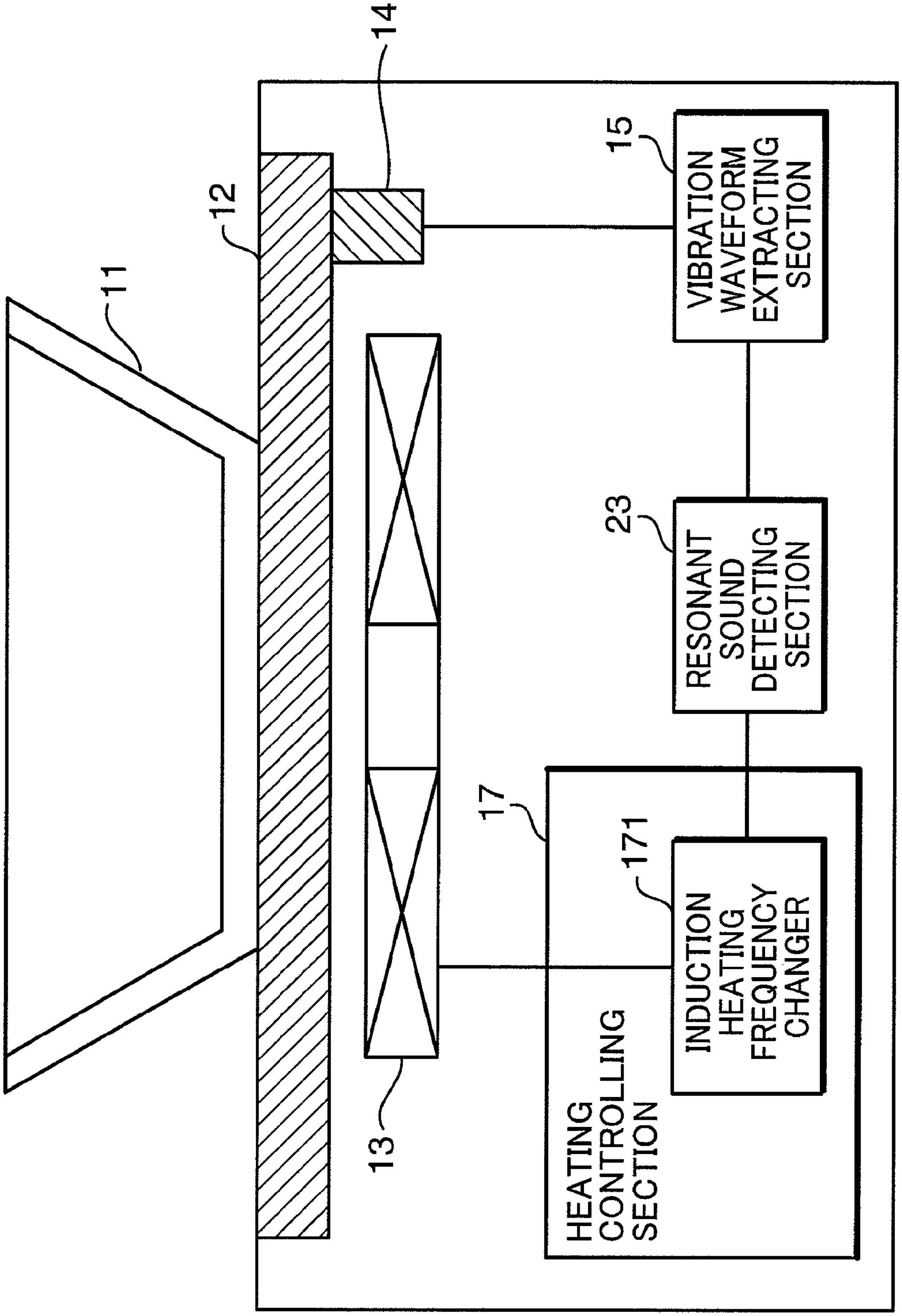
FIG. 18 is a diagram showing an arrangement of an induction heating cooker in accordance with a fifth embodiment of the invention.

In the following, an induction heating cooker in accordance with a fifth embodiment of the invention is described. FIG. 18 is a diagram showing an arrangement of the induction heating cooker in the fifth embodiment. Elements in the fifth embodiment substantially identical or equivalent to those in the first embodiment are indicated with the same reference numerals, and description thereof is omitted herein.

The induction heating cooker shown in FIG. 18 includes a top plate 12, an induction heating section 13, a vibration detecting section 14, a vibration waveform extracting section 15, a resonant sound detecting section 23, and a heating controlling section 17.

The vibration waveform extracting section 15 extracts an amplitude of a frequency component having a frequency in the vicinity of the induction heating frequency by subjecting a vibration waveform detected by the vibration detecting section 14 to a fast Fourier transformation.

The resonant sound detecting section 23 detects a resonant sound (i.e. an interference sound) to be generated from a cooking vessel 11 resulting from resonating with a vibration of the induction heating section 13, with use of a maximum value of the amplitude extracted by the vibration waveform extracting section 15 at a predetermined sampling time interval.

The heating controlling section 17 includes an induction heating frequency changer 171. The induction heating frequency changer 171 changes the induction heating frequency of the induction heating section 13, in the case where generation of a resonant sound is detected by the resonant sound detecting section 23.

In the fifth embodiment, the induction heating cooker corresponds to an example of a resonance sound detection device, the induction heating section 13 corresponds to an example of a vibration source, the cooking vessel 11 corresponds to an example of a vibrating member, the vibration detecting section 14 corresponds to an example of a vibration detecting section, the resonant sound detecting section 23 corresponds to an example of a resonant sound detecting section, the vibration waveform extracting section 15 corresponds to an example of a vibration waveform extracting section, and the induction heating frequency changer 171 corresponds to an example of an induction heating frequency changing section.

Figure 19:
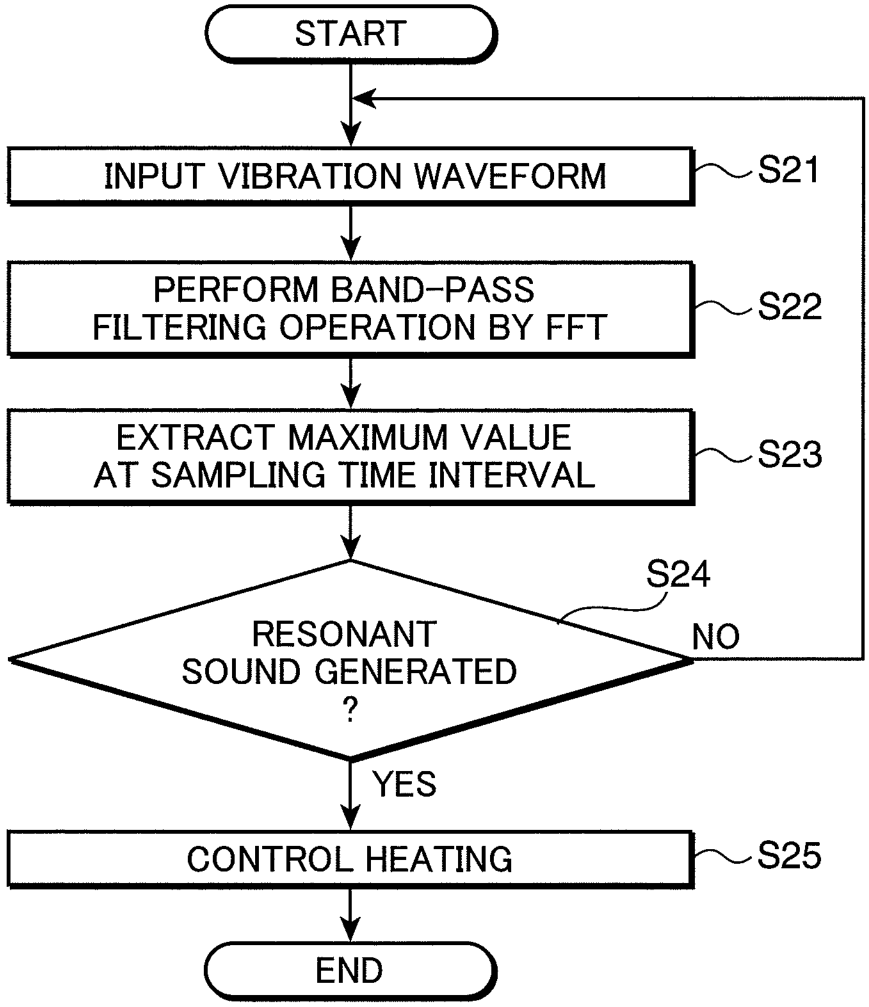
FIG. 19 is a flowchart for describing an operation to be performed by the induction heating cooker in the fifth embodiment.
Figure 20:
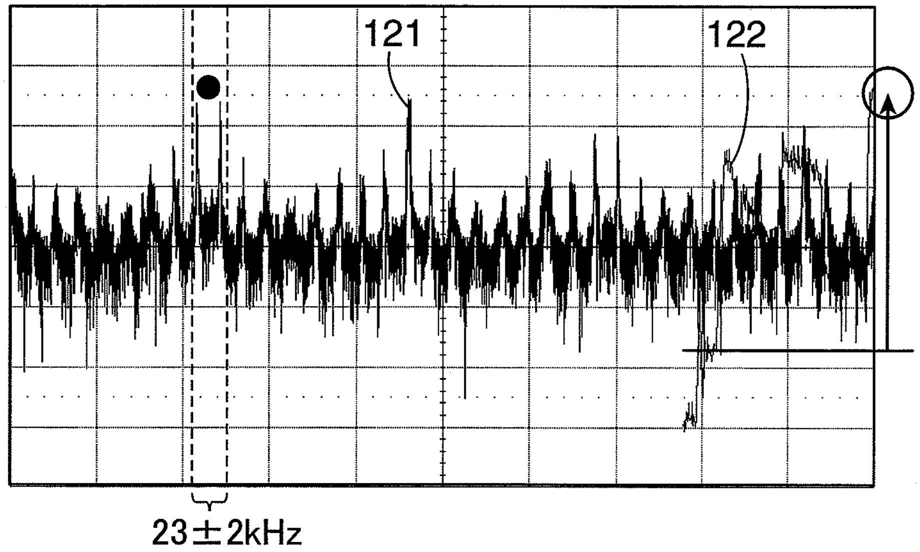
FIG. 20 is a diagram showing an example of a result obtained by subjecting a vibration waveform to be detected by the vibration detecting section to a fast Fourier transformation.

Next, an operation to be performed by the induction heating cooker in the fifth embodiment is described. FIG. 19 is a flowchart for describing an operation to be performed by the induction heating cooker in the fifth embodiment. First, the vibration detecting section 14 inputs a vibration waveform to the vibration waveform extracting section 15 (Step S21). Then, the vibration waveform extracting section 15 extracts an amplitude of a frequency component having a frequency in the vicinity of the induction heating frequency by performing a band-pass filtering operation on the inputted vibration waveform with use of an FFT (Step S22).

Subsequently, the resonant sound detecting section 23 extracts only a maximum value of the output from the vibration waveform extracting section 15 at a predetermined sampling time interval (Step S23). Then, the resonant sound detecting section 23 judges whether a resonant sound is generated, based on the extracted maximum value of the amplitude of the vibration waveform (Step S24). If it is judged that no resonant sound is generated (NO in Step S24), the routine returns to Step S21 to repeatedly execute the operations from Step S21 through Step S24. If, on the other hand, it is judged that a resonant sound is generated (YES in Step S24), the induction heating frequency changer 171 changes the induction heating frequency of the induction heating section 13 (Step S25).

Figure 21:
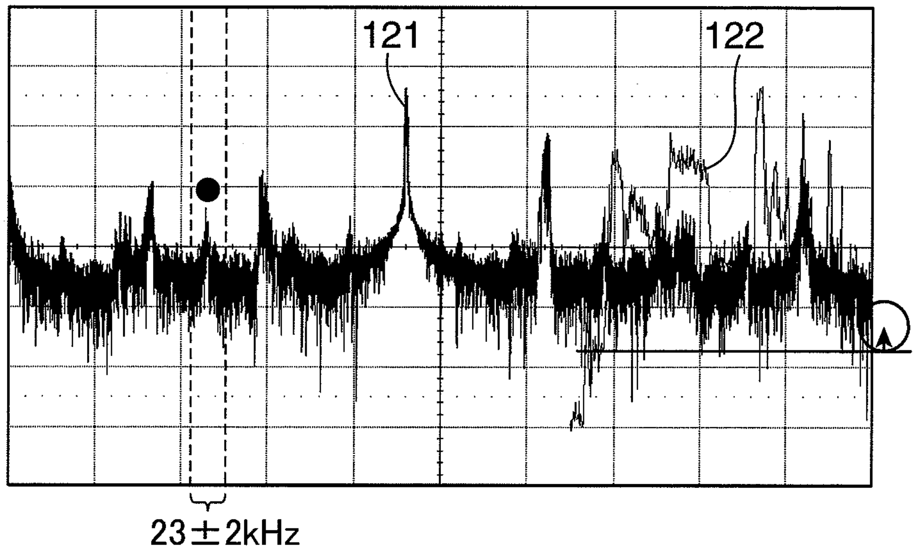
FIG. 21 is a diagram showing an example of a result obtained by subjecting a vibration waveform to be detected by the vibration detecting section to a fast Fourier transformation.
Figure 22:
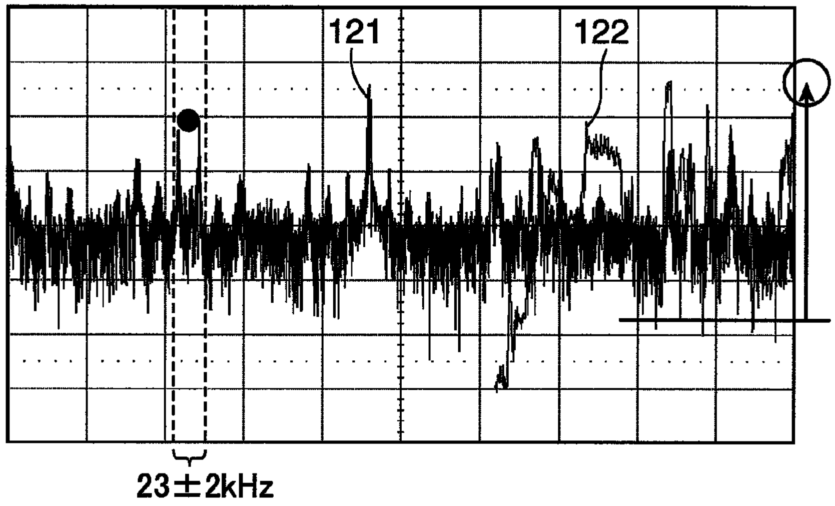
FIG. 22 is a diagram showing an example of a result obtained by subjecting a vibration waveform to be detected by the vibration detecting section to a fast Fourier transformation.
Figure 23:
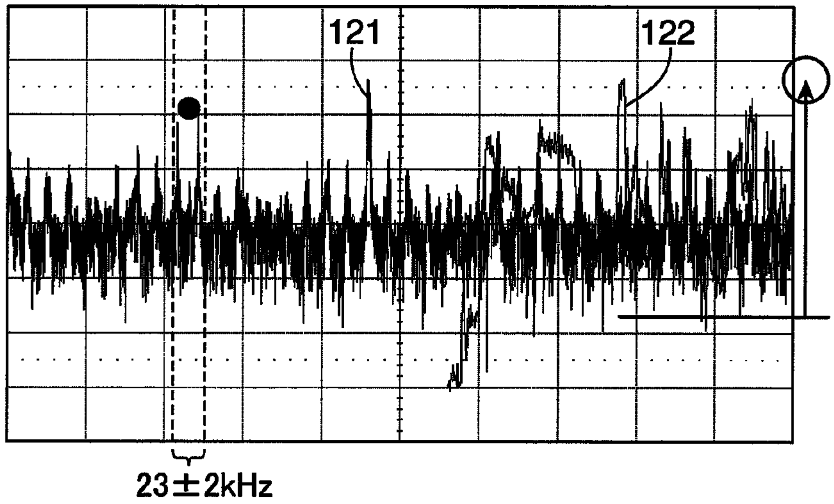
FIG. 23 is a diagram showing an example of a result obtained by subjecting a vibration waveform to be detected by the vibration detecting section to a fast Fourier transformation.
Figure 24:
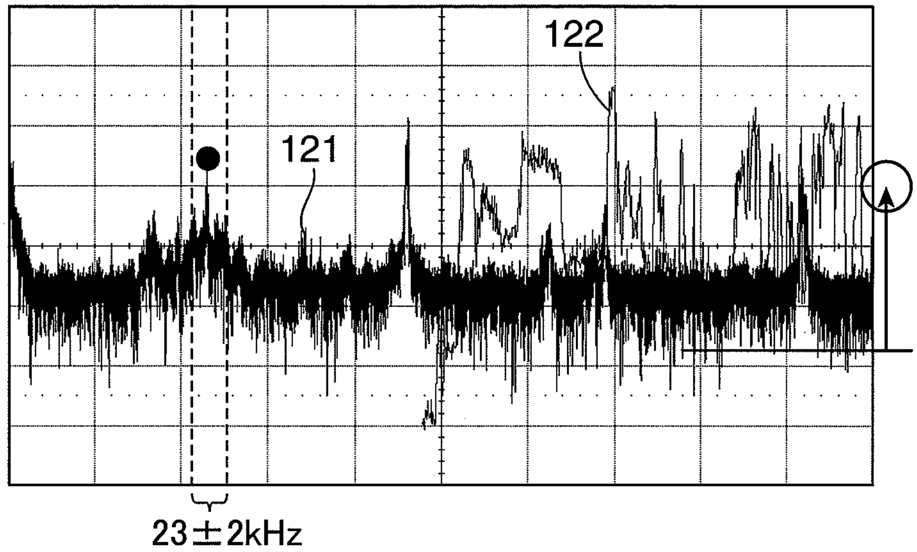
FIG. 24 is a diagram showing an example of a result obtained by subjecting a vibration waveform to be detected by the vibration detecting section to a fast Fourier transformation.
Figure 25:
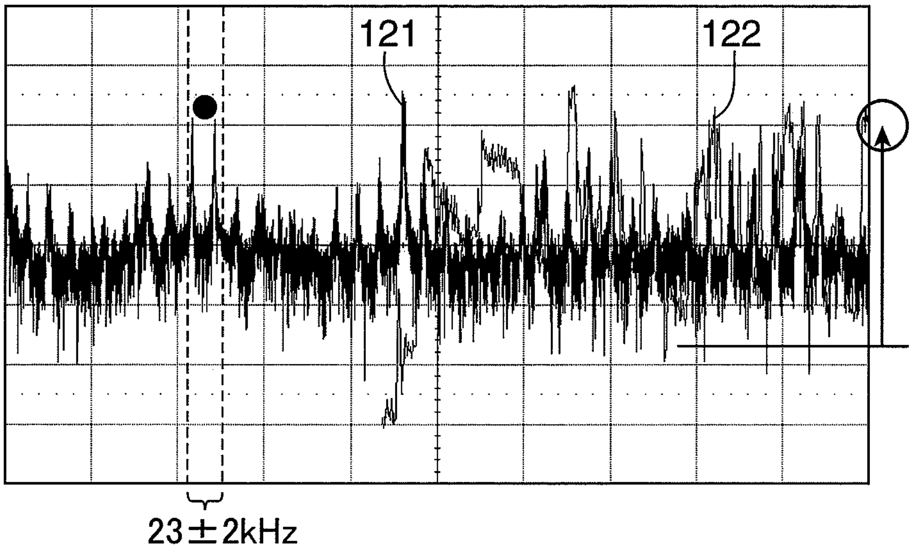
FIG. 25 is a diagram showing an example of a result obtained by subjecting a vibration waveform to be detected by the vibration detecting section to a fast Fourier transformation.

In this section, the resonant sound detecting operation in Step S24 in FIG. 19 is described. FIGS. 20 through 25 are diagrams showing examples of FFT results obtained by subjecting a vibration waveform to be detected by the vibration detecting section to a fast Fourier transformation. FIGS. 20, 22, 23, and 25 show vibration waveforms, wherein a relatively large resonant sound is detected. FIG. 21 shows a vibration waveform, wherein a resonant sound is not detected. FIG. 24 shows a vibration waveform, wherein a relatively small resonant sound is detected. Referring to FIGS. 20 through 25, waveforms 121 each is a vibration waveform showing an FFT result obtained by subjecting a vibration waveform to be detected by the vibration detecting section 14 to a fast Fourier transformation, and waveforms 122 each is a waveform showing a time-based change in maximum value of an amplitude in the vicinity of the induction heating frequency.

As shown by the waveforms 121 in FIG. 20 through 25, at the time when a resonant sound is generated, an oscillatory waveform is observed at an interval of about 2.7 kHz, which is a value obtained by equally dividing 46 kHz i.e. a frequency of about twice as large as the induction heating frequency by 17. Accordingly, oscillatory waveforms of 21.6 kHz and 24.3 kHz are detected in a frequency band of 23±2 kHz, which is near the induction heating frequency. Generation of a resonant sound can be easily detected by observing a maximum value of an amplitude near the induction heating frequency. Specifically, as indicated by the waveforms 122 in FIGS. 20 through 25, in the case where a relatively large resonant sound is detected, the maximum value of the amplitude in the vicinity of the induction heating frequency is also increased. In the case where a relatively small resonant sound is detected, the maximum value of the amplitude near the induction heating frequency is also decreased. In the case where no resonant sound is detected, no maximum value of an amplitude near the induction heating frequency is detected. The resonant sound detecting section 23 judges whether an extracted maximum value of an amplitude of a vibration waveform is larger than a predetermined value. Then, the resonant sound detecting section 23 determines that a resonant sound is generated, if it is judged that the extracted maximum value of the amplitude is larger than the predetermined value; and determines that a resonant sound is not generated, if it is judged that the extracted maximum value of the amplitude is equal to or smaller than the predetermined value.

Figure 26:
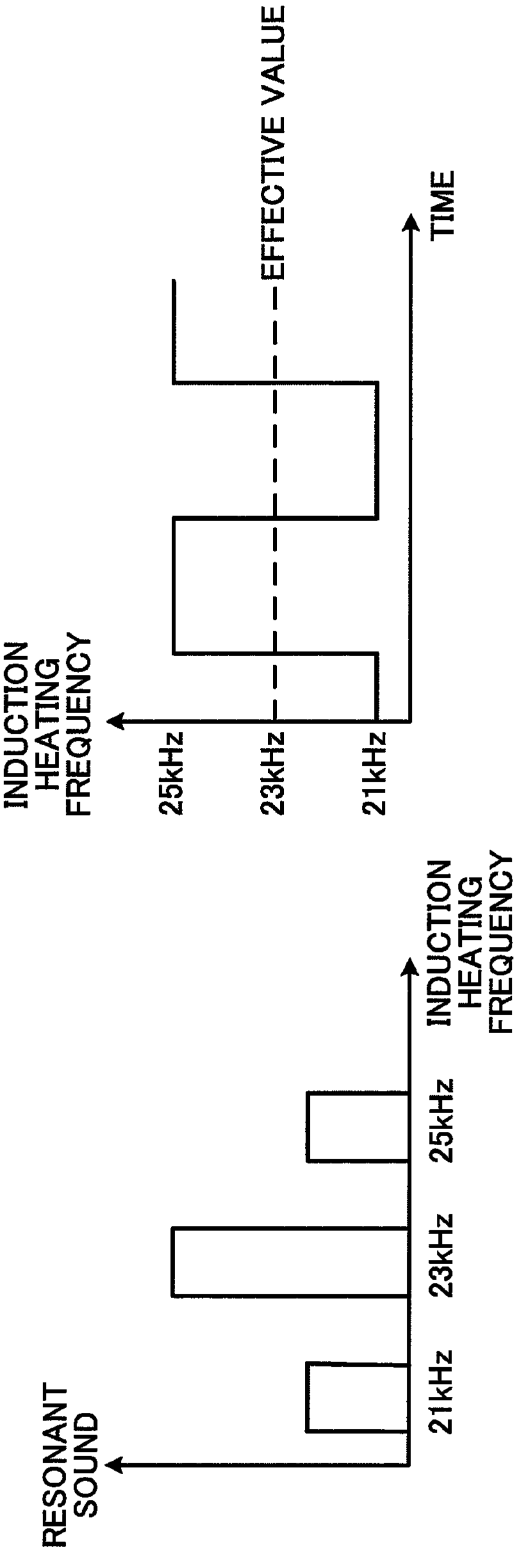
FIG. 26 is a diagram for describing an induction heating frequency changing operation in the fifth embodiment.

Next, the induction heating frequency changing operation in Step S25 in FIG. 19 is described. FIG. 26 is a diagram for describing the induction heating frequency changing operation in the fifth embodiment. The left-side graph in FIG. 26 shows a relation between an induction heating frequency and a resonant sound, and the right-side graph in FIG. 26 shows a relation between a time and an induction heating frequency.

Generation of a resonant sound can be suppressed by lowering the induction heating frequency. However, the heating performance of the induction heating cooker may be lowered by lowering the induction heating frequency. In view of this, in the fifth embodiment, the induction heating frequency is cyclically changed.

As shown by the left-side graph in FIG. 26, generation of a resonant sound can be suppressed by decreasing a currently used induction heating frequency of 23 kHz to 21 kHz, or increasing the currently used induction heating frequency of 23 kHz to 25 kHz. In this embodiment, the induction heating frequency changer 171 cyclically increases and decreases the induction heating frequency of the induction heating section 13. Specifically, as shown by the right-side graph in FIG. 26, the induction heating frequency changer 171 suppresses generation of a resonant sound, while suppressing lowering of the heating performance, by cyclically changing the induction heating frequency of the induction heating section 13 between 21 kHz and 25 kHz.

In this embodiment, the induction heating frequency of the induction heating section 13 is cyclically changed. The invention is not specifically limited to the above. Alternatively, the induction heating frequency of the induction heating section 13 may be simply decreased, or simply increased.

As described above, the vibration detecting section 14 is operable to detect a vibration of the cooking vessel 11 to be vibrated by the induction heating section 13. The resonant sound detecting section 23 detects a resonant sound to be generated from the cooking vessel 11 resulting from resonating with a vibration of the induction heating section 13, based on the vibration waveform detected by the vibration detecting section 14. Accordingly, generation of a resonant sound can be securely detected by observing the vibration waveform of the cooking vessel 11 to be vibrated by the induction heating section 13.

In this embodiment, an amplitude of a frequency component having a frequency in the vicinity of the induction heating frequency is extracted by subjecting a vibration waveform detected by the vibration waveform detecting section 14 to a fast Fourier transformation. Then, a resonant sound to be generated from the cooking vessel 11 resulting from resonating with a vibration of the induction heating section 13 is detected with use of a maximum value of the amplitude extracted by the vibration waveform extracting section 15 at a predetermined sampling time interval. Specifically, at the time of resonance, an oscillatory waveform appears in the vicinity of the induction heating frequency of the fast Fourier transformed vibration waveform. Accordingly, generation of a resonant sound can be securely detected by observing the maximum value of the amplitude of the frequency component having the frequency in the vicinity of the induction heating frequency extracted at the predetermined sampling time interval.

Further, in the case where generation of a resonant sound is detected, the induction heating frequency changer 171 is operable to change the induction heating frequency of the induction heating section 13. This enables to suppress generation of a resonant sound.

Figure 27:
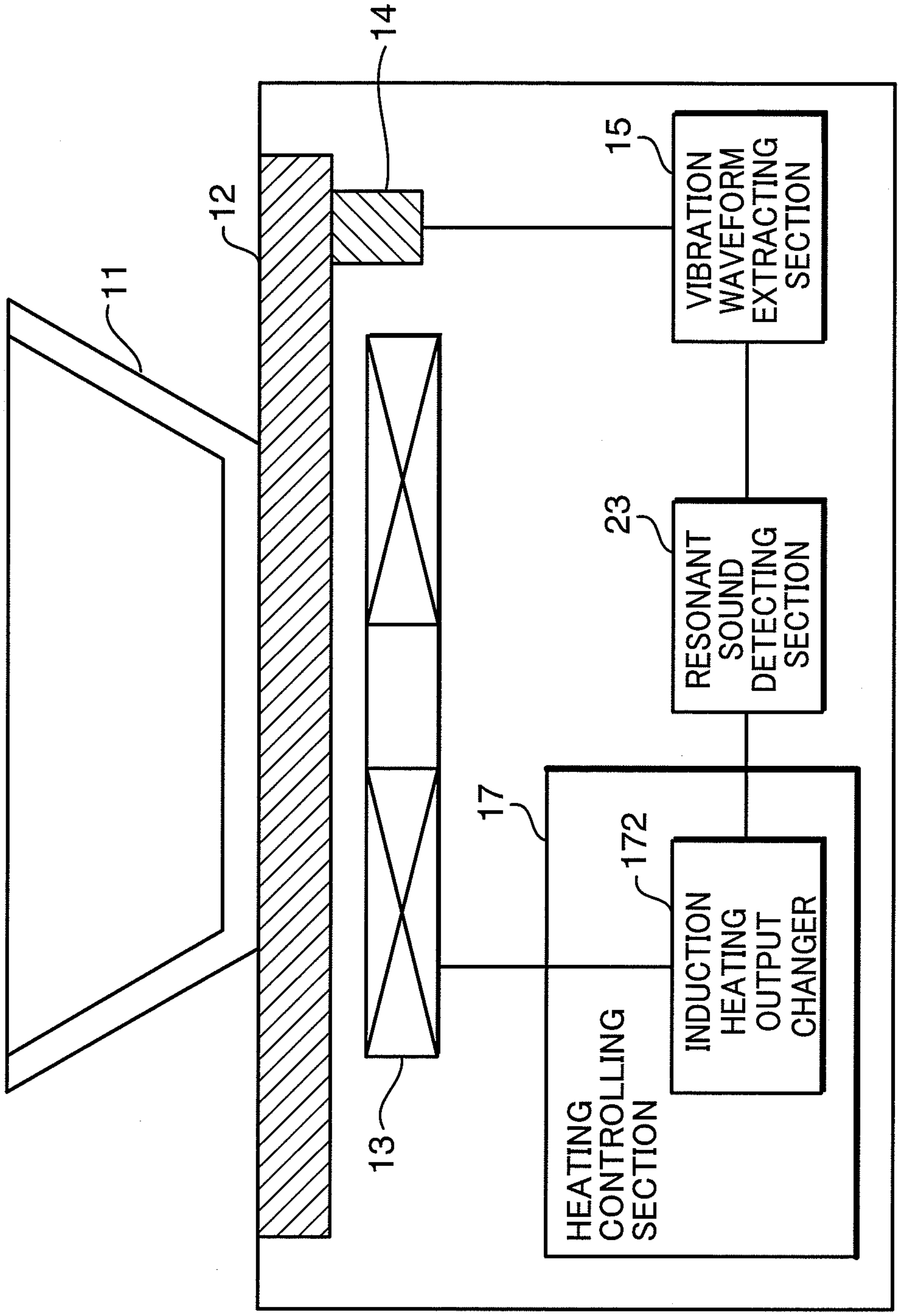
FIG. 27 is a diagram showing an arrangement of an induction heating cooker in accordance with a sixth embodiment of the invention.

In the following, an induction heating cooker in accordance with a sixth embodiment of the invention is described. In the fifth embodiment, the induction heating frequency of the induction heating section 13 is changed. In the sixth embodiment, an induction heating output of an induction heating section 13 is changed. FIG. 27 is a diagram showing an arrangement of the induction heating cooker. Elements in the sixth embodiment substantially identical or equivalent to those in the fifth embodiment are indicated with the same reference numerals, and description thereof is omitted herein.

A heating controlling section 17 includes an induction heating output changer 172. The induction heating output changer 172 changes the induction heating output of the induction heating section 13, in the case where generation of a resonant sound is detected by a resonant sound detecting section 23. In the sixth embodiment, the induction heating output changer 172 corresponds to an example of an induction heating output changing section.

Next, an operation to be performed by the induction heating cooker in the sixth embodiment is described. The operation to be performed by the induction heating cooker in the sixth embodiment is substantially the same as the operation to be performed by the induction heating cooker in the fifth embodiment except for the heating controlling operation in Step S25 in FIG. 19.

Figure 28:
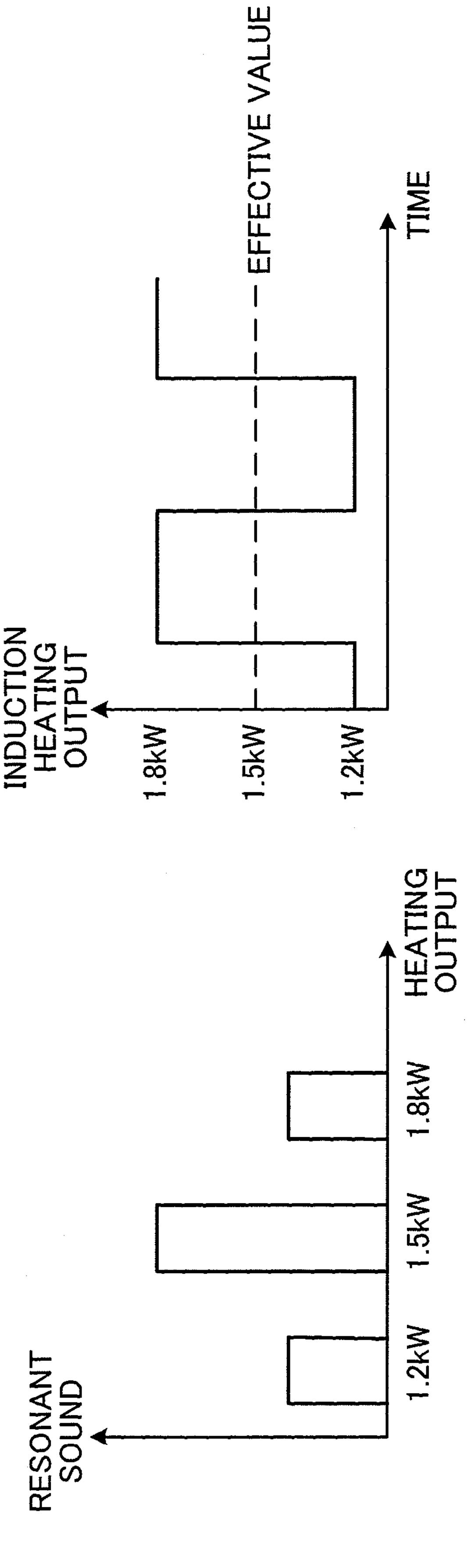
FIG. 28 is a diagram for describing an induction heating output changing operation in the sixth embodiment.

In Step S25 in FIG. 19, the induction heating output changer 172 changes the induction heating output of the induction heating section 13. FIG. 28 is a diagram for describing the induction heating output changing operation in the sixth embodiment. The left-side graph in FIG. 28 shows a relation between an induction heating output and a resonant sound, and the right-side graph in FIG. 28 shows a relation between a time and an induction heating output.

Generation of a resonant sound can be suppressed by lowering the induction heating output. However, the heating performance of the induction heating cooker may be lowered by lowering the induction heating output. In view of this, in the sixth embodiment, the induction heating output is cyclically changed.

As shown by the left-side graph in FIG. 28, generation of a resonant sound can be suppressed by decreasing a currently used induction heating output of 1.5 kW to 1.2 kW, or increasing the currently used induction heating output of 1.5 kW to 1.8 kW. In this embodiment, the induction heating output changer 172 cyclically increases and decreases the induction heating output of the induction heating section 13. Specifically, as shown by the right-side graph in FIG. 28, the induction heating output changer 172 suppresses generation of a resonant sound, while suppressing lowering of the heating performance, by cyclically changing the induction heating output of the induction heating section 13 between 1.2 kW and 1.8 kW.

In this embodiment, the induction heating output of the induction heating section 13 is cyclically changed. The invention is not specifically limited to the above. Alternatively, the induction heating output of the induction heating section 13 may be simply decreased, or simply increased.

As described above, in the case where generation of a resonant sound is detected, the induction heating output changer 172 is operable to change the induction heating output of the induction heating section 13. This enables to suppress generation of a resonant sound.

Figure 29:
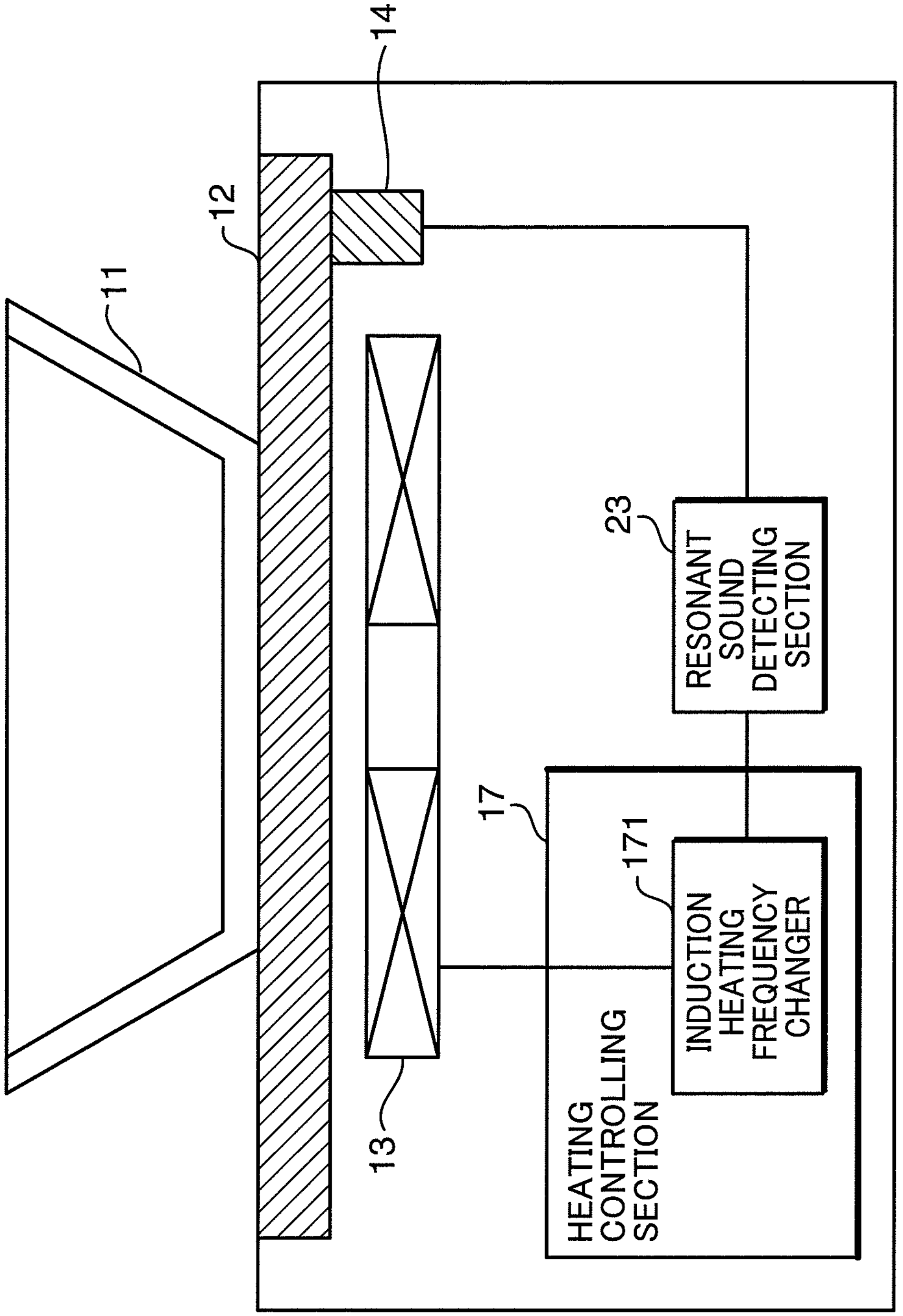
FIG. 29 is a diagram showing an arrangement of an induction heating cooker in accordance with a seventh embodiment of the invention.

In the following, an induction heating cooker in accordance with a seventh embodiment of the invention is described. In the fifth and the sixth embodiments, a resonant sound is detected with use of a maximum value of an amplitude of a frequency component having a frequency in the vicinity of the induction heating frequency extracted at a predetermined sampling time interval. In the seventh embodiment, a resonant sound is detected, based on multiple oscillatory waveforms appearing in a fast Fourier transformed vibration waveform. FIG. 29 is a diagram showing an arrangement of the induction heating cooker in the seventh embodiment. Elements in the seventh embodiment substantially identical or equivalent to those in the fifth embodiment are indicated with the same reference numerals, and description thereof is omitted herein.

A resonant sound detecting section 23 detects a resonant sound to be generated from a cooking vessel 11 resulting from resonating with a vibration of an induction heating section 13, in the case where a vibration waveform detected by a vibration detecting section 14 is subjected to a fast Fourier transformation, and multiple oscillatory waveforms appear in the FFT vibration waveform.

Figure 30:
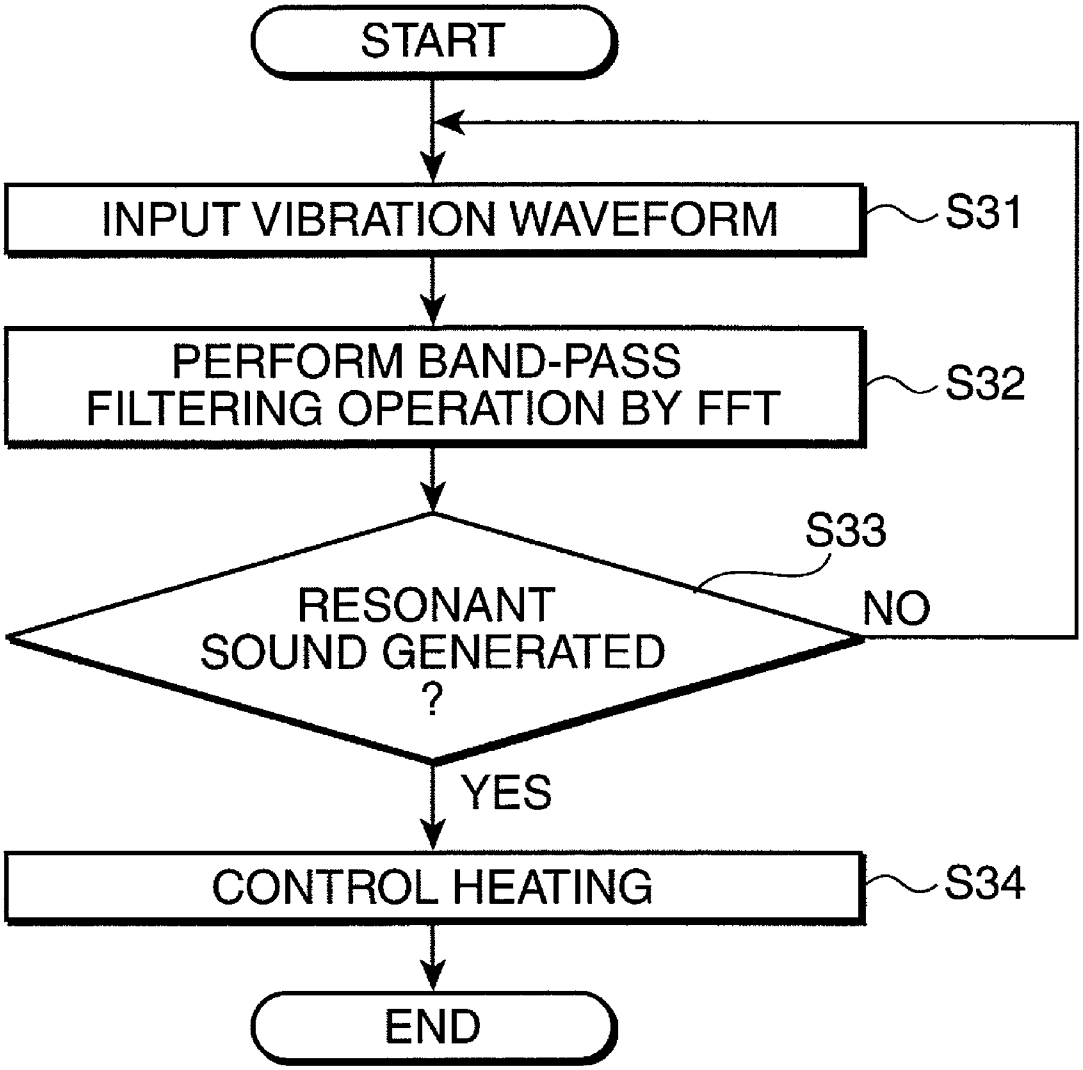
FIG. 30 is a flowchart for describing an operation to be performed by the induction heating cooker in the seventh embodiment.
Figure 31:
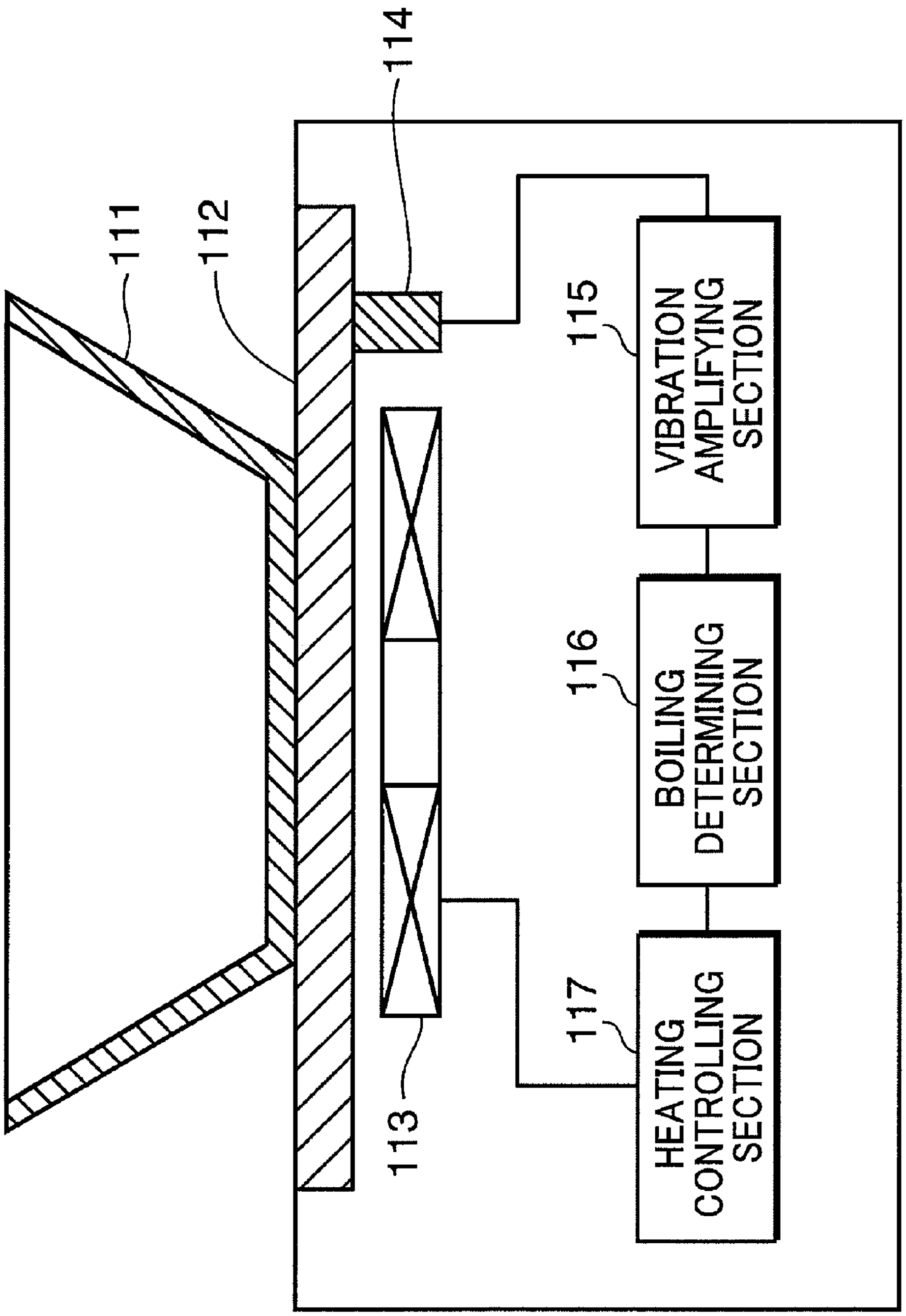
FIG. 31 is a diagram showing an arrangement of a conventional induction heating cooker.
Figure 32:
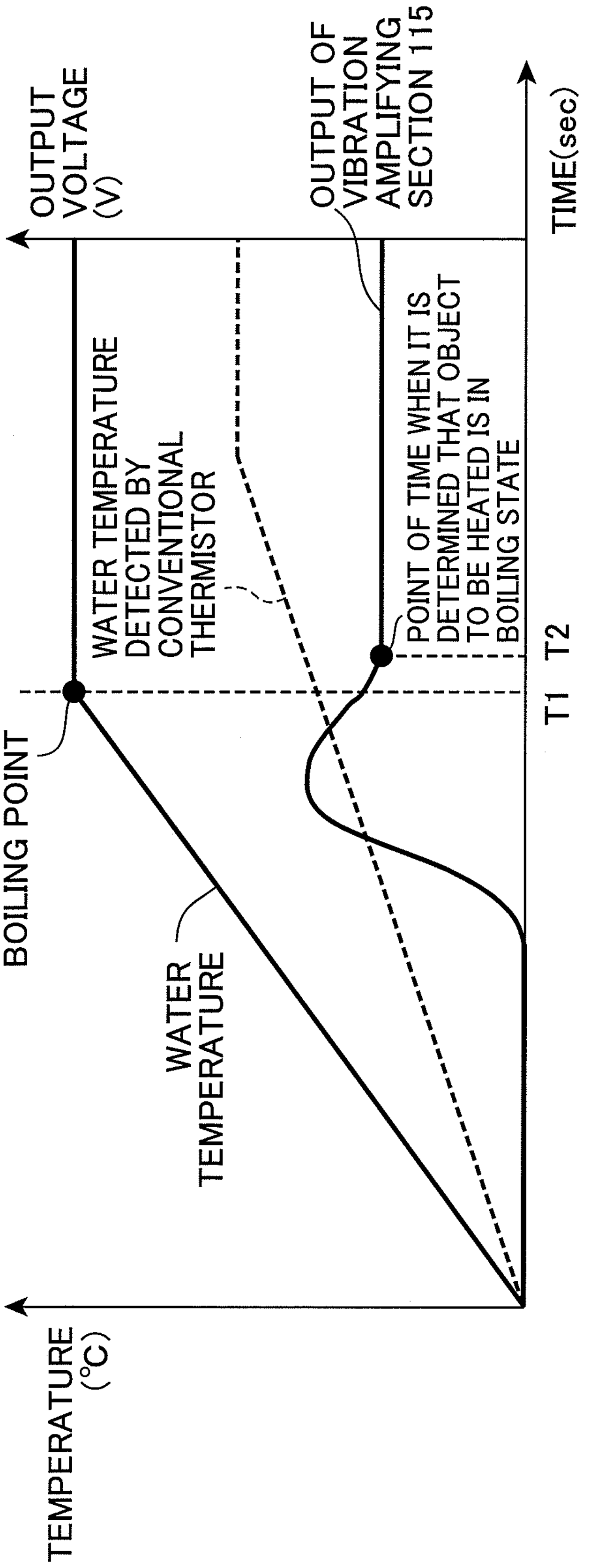
FIG. 32 is a graph showing a time-based change in vibration waveform of the induction heating cooker recited in patent document 1.
Figure 33:
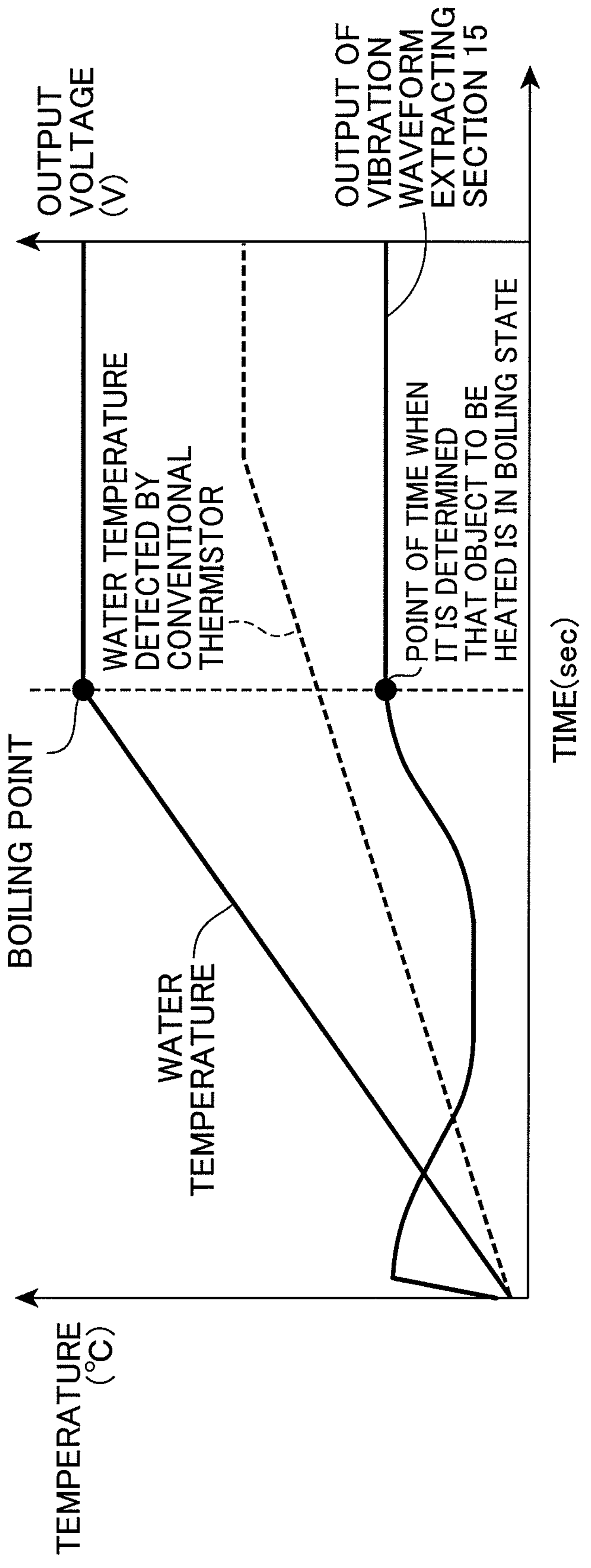
FIG. 33 is a graph showing a time-based change in vibration waveform of the induction heating cooker recited in patent document 2.

Next, an operation to be performed by the induction heating cooker in the seventh embodiment is described. FIG. 30 is a flowchart for describing the operation to be performed by the induction heating cooker in the seventh embodiment.

Since the operation in Step S31 is identical to the operation in Step S21 to be performed by the induction heating cooker in the fifth embodiment shown in FIG. 19, description thereof is omitted herein. In Step S32, the resonant sound detecting section 23 performs a band-pass filtering operation on an inputted vibration waveform by using a fast Fourier transformation. Then, in Step S33, the resonant sound detecting section 23 judges whether multiple oscillatory waveforms appear in the fast Fourier transformed vibration waveform. If it is judged that multiple oscillatory waveforms do not appear in the fast Fourier transformed vibration waveform (NO in Step S33), the routine returns to Step S31, and repeatedly executes the operations from Step S31 through Step S33.

If, on the other hand, it is judged that multiple oscillatory waveforms appear in the fast Fourier transformed vibration waveform (YES in Step S33), an induction heating frequency changer 171 changes the induction heating frequency of the induction heating section 13 (Step S34). The induction heating frequency changing operation to be performed by the induction heating frequency changer 171 in the seventh embodiment is the same as the induction heating frequency changing operation in the fifth embodiment. In the seventh embodiment, the induction heating frequency changer 171 changes the induction heating frequency of the induction heating section 13. The invention is not specifically limited to the above. Alternatively, an induction heating output changer 172 may change an induction heating output of the induction heating section 13. The induction heating output changing operation to be performed by the induction heating output changer 172 in the seventh embodiment is the same as the induction heating output operation in the sixth embodiment.

As described above, the resonant sound detecting section 23 is operable to detect a resonant sound to be generated from the cooking vessel 11 resulting from resonating with a vibration of the induction heating section 13, in the case where a vibration waveform detected by the vibration detecting section 14 is subjected to a fast Fourier transformation, and multiple oscillatory waveforms appear in the fast Fourier transformed vibration waveform. Specifically, at the time of resonance, multiple oscillatory waveforms appear in a fast Fourier transformed vibration waveform. Accordingly, generation of a resonant sound can be securely detected by detecting the multiple oscillatory waveforms in the fast Fourier transformed vibration waveform.

In the fifth through the seventh embodiments, merely a resonant sound is detected. The invention is not specifically limited to the above. Alternatively, the boiling determining operation in the first through the fourth embodiments may be performed in addition to a resonant sound detecting operation. As shown in FIGS. 20 through 25, at the time of resonance, there is no change in a waveform at a frequency (46 kHz) of about twice as large as the induction heating frequency. Accordingly, even at the time of resonance, it is possible to extract a vibration waveform of a frequency component having a frequency of about twice as large as the induction heating frequency, from a vibration waveform detected by the vibration detecting section 14, and perform a boiling detecting operation along with a resonant sound detecting operation.

The foregoing embodiments may primarily embrace the inventions having the following arrangements.

An induction heating cooker according to an aspect of the invention includes: an induction heating section for inductively heating a cooking vessel for containing an object to be heated; a vibration detecting section for detecting a vibration of the cooking vessel; a vibration waveform extracting section for extracting a vibration waveform of a frequency component having a frequency of about twice as large as an induction heating frequency, from a waveform of the vibration detected by the vibration detecting section; and a determining section for determining a state of the object to be heated, based on the vibration waveform extracted by the vibration waveform extracting section.

An induction heating cooking method according to another aspect of the invention includes: an induction heating step of inductively heating a cooking vessel for containing an object to be heated; a vibration detecting step of detecting a vibration of the cooking vessel; a vibration waveform extracting step of extracting a vibration waveform of a frequency component having a frequency of about twice as large as an induction heating frequency, from a waveform of the vibration detected in the vibration detecting step; and a determining step of determining a state of the object to be heated, based on the vibration waveform extracted in the vibration waveform extracting step.

An induction heating cooking program according to yet another aspect of the invention causes a computer to function as: an induction heating section for inductively heating a cooking vessel for containing an object to be heated; a vibration detecting section for detecting a vibration of the cooking vessel; a vibration waveform extracting section for extracting a vibration waveform of a frequency component having a frequency of about twice as large as an induction heating frequency, from a waveform of the vibration detected by the vibration detecting section; and a determining section for determining a state of the object to be heated, based on the vibration waveform extracted by the vibration waveform extracting section.

In the above arrangements, the induction heating section is operable to inductively heat the cooking vessel for containing the object to be heated, and the vibration detecting section is operable to detect the vibration of the cooking vessel. Then, the vibration waveform extracting section is operable to extract the vibration waveform of the frequency component having the frequency of about twice as large as the induction heating frequency from the waveform of the vibration detected by the vibration detecting section. Then, the determining section is operable to determine the state of the object to be heated, based on the vibration waveform extracted by the vibration waveform extracting section.

When the cooking vessel is inductively heated, a repulsion force is imparted to the cooking vessel two times per cycle of the induction heating frequency. As a result, the vibration frequency of the cooking vessel is made equal to about twice as large as the induction heating frequency. Accordingly, the vibration waveform of the frequency component having the frequency of about twice as large as the induction heating frequency is extracted, and the state of the object to be heated is determined based on the extracted vibration waveform. This enables to accurately detect the state of the object to be heated in the cooking vessel. Also, the above arrangements are advantageous in effectively avoiding cooking failure such as overflow of air bubbles and the like by e.g. detecting whether the object to be heated is in a boiling state, and adjusting the quantity of heat to be applied to the cooking vessel based on the detection result.

In the induction heating cooker, preferably, the vibration waveform extracting section may extract an amplitude of the frequency component having the frequency of about twice as large as the induction heating frequency by subjecting the waveform of the vibration detected by the vibration detecting section to a fast Fourier transformation.

In the above arrangement, the amplitude of the frequency component having the frequency of about twice as large as the induction heating frequency is extracted by subjecting the waveform of the detected vibration to the fast Fourier transformation. This enables to easily extract the amplitude of the frequency component having the frequency of about twice as large as the induction heating frequency by the fast Fourier transformation, and easily detect a vibration of the cooking vessel. Alternatively, the vibration waveform extracting section may extract the amplitude of the frequency component having the frequency of about twice as large as the induction heating frequency by a filtering circuit. The modification, however, may not be preferable because an analog electronic circuit is required, and the production cost may be increased, as compared with a recently-developed digital processing device.

In the induction heating cooker, preferably, the vibration waveform extracting section may calculate an absolute value of a difference between a peak value and a bottom value of the waveform of the vibration detected by the vibration detecting section to extract the calculated absolute value, as an amplitude of the frequency component having the frequency of about twice as large as the induction heating frequency.

In the above arrangement, the absolute value of the difference between the peak value and the bottom value of the waveform of the detected vibration is calculated, and the calculated absolute value is extracted, as the amplitude of the frequency component having the frequency of about twice as large as the induction heating frequency. This does not require a complicated operation such as a band-pass filtering operation using a specific frequency, and enables to produce an induction heating cooker at a low cost by directly processing a waveform.

In the induction heating cooker, preferably, the determining section may determine the state of the object to be heated, with use of a maximum value of the amplitude extracted by the vibration waveform extracting section at a predetermined sampling time interval.

In the above arrangement, the state of the object to be heated is determined with use of the maximum value of the amplitude extracted at the predetermined sampling time interval. Specifically, a change in the amplitude resulting from generation of air bubbles and the like at the time of boiling may likely to cause a change in the vibration primarily in a direction from a top plate to the cooking vessel. A change in the vibration is small, if solely an average value of vibration is observed. Therefore, it is effective to monitor the maximum value of the amplitude in order to detect a change in the vibration. The vibration waveform resulting from generation of air bubbles can be more advantageously detected by retrieving the maximum value of the amplitude extracted at the predetermined sampling time interval. Also, the above arrangement is advantageous in more effectively avoiding cooking failure such as overflow of air bubbles and the like by e.g. detecting whether the object to be heated is in a boiling state, and adjusting the quantity of heat to be applied to the cooking vessel based on the detection result by the state of the object to be heated is determined by comparing the maximum value with a predetermined value.

Preferably, the induction heating cooker may further comprise: a waveform change pattern storing section for storing a waveform change pattern on a vibration waveform of the cooking vessel in correlation to at least one of a kind of the cooking vessel, a kind of the object to be heated, and a quantity of the object to be heated, wherein the determining section includes a waveform change pattern specifying section for comparing a waveform change pattern of the vibration waveform to be extracted by the vibration waveform extracting section with the waveform change pattern stored in the waveform change pattern storing section to specify at least one of the kind of the cooking vessel, the kind of the object to be heated, and the quantity of the object to be heated.

In the above arrangement, the waveform change pattern on the vibration waveform of the cooking vessel is pre-stored in the waveform change pattern storing section in correlation to at least one of the kind of the cooking vessel, the kind of the object to be heated, and the quantity of the object to be heated. The waveform change pattern specifying section is operable to compare the waveform change pattern of the vibration waveform to be extracted by the vibration waveform extracting section with the waveform change pattern stored in the waveform change pattern storing section to specify at least one of the kind of the cooking vessel, the kind of the object to be heated, and the quantity of the object to be heated. Thus, the change in the vibration depending on at least one of the kind of the cooking vessel, the kind of the object to be heated, and the quantity of the object to be heated can be detected with high precision. The state of the object to be heated can be determined depending on at least one of the kind of the cooking vessel, the kind of the object to be heated, and the quantity of the object to be heated.

In the induction heating cooker, preferably, the determining section may determine whether the object to be heated is in a boiling state, based on the vibration waveform extracted by the vibration waveform extracting section. In this arrangement, it is determined whether the object to be heated is in a boiling state, based on the extracted vibration waveform. Accordingly, overflow of air bubbles and the like can be avoided by detecting whether the object to be heated is in a boiling state, and adjusting the quantity of heat to be applied to the cooking vessel based on the detection result.

In the induction heating cooker, preferably, the determining section may determine that another object to be heated is put in the cooking vessel, based on the vibration waveform extracted by the vibration waveform extracting section. In this arrangement, it is determined whether another object to be heated is put in the cooking vessel, based on the extracted vibration waveform. Accordingly, in the case where another object to be heated is put in the cooking vessel, a timely heating control can be performed and a proper cooking advice can be provided depending on a cooking procedure by e.g. adjusting the quantity of heat to be applied to the cooking vessel.

In the induction heating cooker, preferably, the induction heating section may include a plurality of induction heating sections for inductively heating a plurality of cooking vessels, the vibration waveform extracting section may calculate the absolute value of the difference between the peak value and the bottom value of the vibration waveform of the frequency component having the frequency of about twice as large as the induction heating frequency of each of the induction heating sections to extract the calculated absolute value, as the amplitude of the frequency component having the frequency of about twice as large as the corresponding induction heating frequency, and the determining section may compare each of the amplitudes extracted by the vibration waveform extracting section with a predetermined value to determine the state of the object to be heated with respect to each of the induction heating sections.

In the above arrangement, the absolute value of the difference between the peak value and the bottom value of the vibration waveform of the frequency component having the frequency of about twice as large as the induction heating frequency of each of the induction heating sections is calculated. Then, the calculated absolute value is extracted, as the amplitude of the frequency component having the frequency of about twice as large as the corresponding induction heating frequency. Then, each of the extracted amplitudes is compared with the predetermined value to determine the state of the object to be heated with respect to each of the induction heating sections.

In the case where a plurality of cooking vessels are simultaneously heated by a plurality of induction heating sections, there is a case that timings of starting heating may be different from each other, even if the induction heating frequencies of the induction heating sections are identical to each other. In such an occasion, the cycles of the induction heating frequencies of the induction heating sections may be displaced from each other, and vibration waveforms of the cooking vessels may be detected to be displaced from each other. The above arrangement enables to accurately detect the state of the object to be heated in each of the cooking vessels by: calculating the absolute value of the difference between the peak value and the bottom value of the vibration waveform of the frequency component having the frequency of about twice as large as each of the induction heating frequencies of the induction heating sections; and extracting the calculated absolute value, as the amplitude of the frequency component having the frequency of about twice as large as the corresponding induction heating frequency, even in the case where the cooking vessels are simultaneously heated by the induction heating sections.

Preferably, the induction heating cooker may further comprise: a heating controlling section for controlling the induction heating section depending on the state of the object to be heated determined by the determining section. In this arrangement, the heating controlling section is operable to control the induction heating section depending on the state of the object to be heated determined by the determining section. This enables to avoid cooking failure, and provide proper cooking assistant.

Preferably, the induction heating cooker may further comprise: a heating controlling section for controlling the induction heating section depending on the state of the object to be heated determined by the determining section; and a changing section for changing at least one of a predetermined value, and the waveform change pattern stored in the waveform change pattern storing section, depending on at least one of the state of the object to be heated determined by the determining section, and a controlled state of the induction heating section to be controlled by the heating controlling section.

In the above arrangement, at least one of the predetermined value, and the waveform change pattern stored in the waveform change pattern storing section is changed depending on at least one of the state of the object to be heated determined by the determining section, and the controlled state of the induction heating section to be controlled by the heating controlling section. This enables to optimally detect the state of the object to be heated, and the kind of the cooking vessel depending on the heating pattern which is varied depending on the state of the object to be heated and the controlled state of the induction heating section.

In the induction heating cooker, preferably, the determining section may determine whether the object to be heated is in a boiling state, exclusively based on a waveform change pattern of a vibration waveform of the cooking vessel. In this arrangement, it is determined whether the object to be heated is in a boiling state, exclusively based on the waveform change pattern of the vibration waveform of the cooking vessel. Specifically, in the case where a change in the waveform substantially identical to the waveform change pattern of the vibration waveform of the cooking vessel is observed, it can be determined that the object to be heated is in a boiling state.

In the induction heating cooker, preferably, the induction heating section may include a plurality of induction heating sections for inductively heating a plurality of cooking vessels at induction heating frequencies different from each other, respectively, the vibration waveform extracting section may extract the amplitude of the frequency component having the frequency of about twice as large as each of the induction heating frequencies of the induction heating sections by subjecting the waveform of the vibration detected by the vibration detecting section to a fast Fourier transformation, and the determining section may compare each of the amplitudes extracted by the vibration waveform extracting section with a predetermined value to determine the state of the object to be heated with respect to each of the induction heating sections.

In the above arrangement, the cooking vessels are inductively heated by the induction heating sections at the induction heating frequencies different from each other, respectively. Then, the vibration waveform extracting section is operable to extract the amplitude of the frequency component having the frequency of about twice as large as each of the induction heating frequencies of the induction heating sections by subjecting the waveform of the detected vibration to the fast Fourier transformation. Then, the determining section is operable to compare each of the amplitudes extracted by the vibration waveform extracting section with the predetermined value to determine the state of the object to be heated with respect to each of the induction heating sections.

Thus, in the case where the cooking vessels are simultaneously heated by the induction heating sections at the induction heating frequencies different from each other, respectively, the amplitude of the frequency component having the frequency of about twice as large as each of the induction heating frequencies of the induction heating sections is extracted by subjecting the waveform of the detected vibration to the fast Fourier transformation. This enables to accurately detect the state of the object to be heated in each of the cooking vessels.

In the induction heating cooker, preferably, the induction heating section may include a plurality of induction heating sections for inductively heating a plurality of cooking vessels, the induction heating cooker may further include: a plurality of temperature detecting sections for detecting temperatures of the cooking vessels, respectively; and a heating controlling section for lowering an induction heating output of one of the induction heating sections, based on the temperature of each of the cooking vessels detected by the temperature detecting sections, and the determining section may determine the state of the object to be heated with respect to each of the induction heating sections by detecting a change in the vibration waveform extracted by the vibration waveform extracting section.

In the above arrangement, the induction heating sections are operable to inductively heat the cooking vessels. The temperature detecting sections are operable to detect the temperatures of the cooking vessels, respectively. Then, the heating controlling section is operable to lower the induction heating output of one of the induction heating sections, based on the temperatures of the cooking vessels detected by the temperature detecting sections. Then, the determining section is operable to determine the state of the object to be heated with respect to each of the induction heating sections by detecting the change in the vibration waveform extracted by the vibration waveform extracting section. Accordingly, even if the induction heating frequencies of the induction heating sections are identical to each other, the state of the object to be heated can be determined with respect to each of the induction heating sections.

In the induction heating cooker, preferably, the vibration detecting section may detect a vibration of the cooking vessel in an ultrasonic frequency band, and detect a vibration of the cooking vessel in an audible frequency band, the vibration waveform extracting section may extract a first vibration waveform of the frequency component having the frequency of about twice as large as the induction heating frequency, from a waveform of the vibration in the ultrasonic frequency band detected by the vibration detecting section, and extract a second vibration waveform of the vibration in the audible frequency band detected by the vibration detecting section, and the determining section may determine whether the object to be heated is in a boiling state, based on the first vibration waveform extracted by the vibration waveform extracting section to compensate for the determination as to the boiling state, based on a change in the second vibration waveform extracted by the vibration waveform extracting section.

In the above arrangement, the vibration detecting section is operable to detect the vibration of the cooking vessel in the ultrasonic frequency band, and the vibration of the cooking vessel in the audible frequency band. Then, the vibration waveform extracting section is operable to extract the first vibration waveform of the frequency component having the frequency of about twice as large as the induction heating frequency, from the waveform of the vibration in the ultrasonic frequency band detected by the vibration detecting section, and extract the second vibration waveform of the vibration in the audible frequency band detected by the vibration detecting section. Then, the determining section is operable to determine whether the object to be heated is in a boiling state, based on the first vibration waveform extracted by the vibration waveform extracting section to compensate for the determination as to the boiling state, based on the change in the second vibration waveform extracted by the vibration waveform extracting section. Thus, the determination as to the boiling state is compensated for based on the vibration waveform in the ultrasonic frequency band, based on the change in the vibration waveform in the audible frequency band. This enables to enhance precision in determination as to a boiling state.

Preferably, the induction heating cooker may further comprise: a temperature detecting section for detecting a temperature of the cooking vessel; and a time-based temperature change amount calculating section for calculating a time-based change amount of the temperature of the cooking vessel detected by the temperature detecting section, wherein the determining section determines that the object to be heated is not in a boiling state, in the case where it is judged that the time-based change amount calculated by the time-based temperature change amount calculating section is larger than a predetermined value, or smaller than 0.

In the above arrangement, the temperature detecting section is operable to detect the temperature of the cooking vessel. The time-based temperature change amount calculating section is operable to calculate the time-based change amount of the temperature of the cooking vessel detected by the temperature detecting section. Then, the determining section is operable to determine that the object to be heated is not in a boiling state, in the case where it is judged that the time-based change amount calculated by the time-based temperature change amount calculating section is larger than the predetermined value or smaller than 0.

There is a case that the vibration waveform of the frequency component having the frequency of about twice as large as the induction heating frequency may be temporarily increased in the initial stage of heating, which may lead to an erroneously detection that the object to be heated is in a boiling state. However, judging as to whether the time-based change amount calculated by the time-based temperature change amount calculating section is larger than the predetermined value or smaller than 0 enables to prevent an erroneous detection as to a boiling state in the initial stage of heating.

A resonance sound detection device according to another aspect of the invention includes: a vibration source; a vibration detecting section for detecting a vibration of a vibrating member to be vibrated by the vibration source; and a resonant sound detecting section for detecting a resonant sound to be generated from the vibrating member resulting from resonating with a vibration of the vibration source, based on a waveform of the vibration detected by the vibration detecting section.

A resonance sound detection method according to yet another aspect of the invention includes: a vibration controlling step of vibrating a vibration source; a vibration detecting step of detecting a vibration of a vibrating member to be vibrated by the vibration source; and a resonant sound detecting step of detecting a resonant sound to be generated from the vibrating member resulting from resonating with a vibration of the vibration source, based on a waveform of the vibration detected in the vibration detecting step.

A resonance sound detection program according to still another aspect of the invention causes a computer to function as: a vibration controlling section for vibrating a vibration source; a vibration detecting section for detecting a vibration of a vibrating member to be vibrated by the vibration source; and a resonant sound detecting section for detecting a resonant sound to be generated from the vibrating member resulting from resonating with a vibration of the vibration source, based on a waveform of the vibration detected by the vibration detecting section.

In the above arrangements, the vibration detecting section is operable to detect the vibration of the vibrating member to be vibrated by the vibration source. Then, the resonant sound detecting section is operable to detect the resonant sound to be generated from the vibrating member resulting from resonating with the vibration of the vibration source, based on the waveform of the vibration detected by the vibration detecting section. This enables to accurately detect generation of a resonant sound by observing the vibration waveform of the vibrating member to be vibrated by the vibration source.

In the resonance sound detection device, preferably, the vibration source may include an induction heating section for inductively heating a cooking vessel for containing an object to be heated, and the vibration detecting section may detect a vibration of the cooking vessel.

In the above arrangement, the resonant sound detecting section is operable to detect the resonant sound to be generated from the cooking vessel resulting from resonating with the vibration of the induction heating section, based on the waveform of the vibration detected by the vibration detecting section. This enables to securely detect generation of a resonant sound by observing the vibration waveform of the cooking vessel to be vibrated by the induction heating section.

In the resonance sound detection device, preferably, the resonant sound detecting section may detect a resonant sound to be generated from the cooking vessel resulting from resonating with a vibration of the induction heating section, in the case where the waveform of the vibration detected by the vibration detecting section is subjected to a fast Fourier transformation, and a plurality of oscillatory waveforms appear in the fast Fourier transformed vibration waveform.

In the above arrangement, the resonant sound detecting section is operable to detect the resonant sound to be generated from the cooking vessel resulting from resonating with the vibration of the induction heating section, in the case where the waveform of the vibration detected by the vibration detecting section is subjected to the fast Fourier transformation, and the plurality of oscillatory waveforms appear in the fast Fourier transformed vibration waveform. At the time of resonance, plural oscillatory waveforms appear in a fast Fourier transformed vibration waveform. Accordingly, generation of a resonant sound can be securely detected by detecting the plural oscillatory waveforms appearing in the fast Fourier transformed vibration waveform.

Preferably, the resonance sound detection device may further comprise: a vibration waveform extracting section for extracting an amplitude of a frequency component having a frequency in a vicinity of an induction heating frequency by subjecting the waveform of the vibration detected by the vibration detecting section to a fast Fourier transformation, wherein the resonant sound detecting section detects a resonant sound to be generated from the cooking vessel resulting from resonating with a vibration of the induction heating section with use of a maximum value of the amplitude extracted by the vibration waveform extracting section at a predetermined sampling time interval.

In the above arrangement, the amplitude of the frequency component having the frequency in the vicinity of the induction heating frequency is extracted by subjecting the waveform of the vibration detected by the vibration detecting section to the fast Fourier transformation. Then, the resonant sound to be generated from the cooking vessel resulting from resonating with the vibration of the induction heating section is detected with use of the maximum value of the amplitude extracted by the vibration waveform extracting section at the predetermined sampling time interval. At the time of resonance, oscillatory waveforms appear in the vicinity of the induction heating frequency of the fast Fourier transformed vibration waveform. Accordingly, generation of a resonant sound can be securely detected by observing the maximum value of the amplitude of the frequency component in the vicinity of the induction heating frequency extracted at the predetermined sampling time interval.

Preferably, the resonance sound detection device may further comprise: an induction heating frequency changing section for changing an induction heating frequency of the induction heating section, in the case where generation of a resonant sound is detected by the resonant sound detecting section. In this arrangement, the induction heating frequency of the induction heating section is changed, in the case where generation of a resonant sound is detected. This enables to suppress generation of a resonant sound.

Preferably, the resonance sound detection device may further comprise: an induction heating output changing section for lowering an induction heating output of the induction heating section, in the case where generation of a resonant sound is detected by the resonant sound detecting section. In this arrangement, the induction heating output of the induction heating section is lowered, in the case where generation of a resonant sound is detected. This enables to suppress generation of a resonant sound.

INDUSTRIAL APPLICABILITY

The induction heating cooker, the induction heating cooking method, and the induction heating cooking program of the invention are useful as an automated cooking assistant apparatus or a like apparatus that enables to avoid cooking failure and provide an optimum cooking advice.

The resonance sound detection device, the resonance sound detection method, and the resonance sound detection program of the invention enable to accurately detect a resonant sound, and effectively suppress generation of a resonant sound, and are useful as a resonance sound detection device, a resonance sound detection method, a resonance sound detection program, and the like for detecting a resonant sound.

The invention claimed is:

1. An induction heating cooker, comprising:

a plurality of induction heating sections for respectively inductively heating a plurality of cooking vessels for containing an object to be heated;

a plurality of vibration detecting sections for respectively detecting vibrations of the plurality of cooking vessels;

a first vibration waveform extracting section for utilizing a time lag in a vibration waveform to be transmitted from the plurality of cooking vessels to the plurality of vibration detecting sections to cancel a vibration waveform in a vibration detection section corresponding to a cooking vessel, of the plurality of cooking vessels, to be subjected to boiling determination out of the plurality of vibration detection section, the vibration waveform to be cancelled being transmitted from cooking vessels, of the plurality of cooking vessels, other than the cooking vessel subjected to the boiling determination, so as to extract solely the vibration waveform from the vibration detection section corresponding to the cooking vessel subjected to the boiling determination;

a second vibration waveform extracting section for extracting a vibration waveform of a frequency component having a frequency of about twice as large as an induction heating frequency, the vibration waveform extracted by the second vibration waveform extracting section being extracted from the vibration waveform extracted by the first vibration waveform extracting section;

a waveform change pattern storing section for preliminarily storing a waveform change pattern on a vibration waveform of the cooking vessel subjected to the boiling detection in correlation to at least one of a kind of the cooking vessel, a kind of the object to be heated, and a quantity of the object to be heated;

a predetermined value storing section for preliminarily storing a predetermined value to be used for determining a boiling state in correlation to at least one of the kind of the cooking vessel, the kind of the object to be heated, and the quantity of the object to be heated;

a waveform change pattern specifying section for comparing a waveform change pattern of the vibration wave form extracted by the second vibration waveform extracting section with the waveform change pattern stored in the waveform change pattern storing section to specify at least one of the kind of the cooking vessel, the kind of the object to be heated, and the quantity of the object to be heated; and a determining section including:

a reading section for reading, from the predetermined value storing section, the predetermined value in correlation to the at least one of the kind of the cooking vessel, the kind of the object to be heated, and the quantity of the object to be heated that has been specified by the waveform change pattern specifying section;

a predetermined value determining section for determining whether a maximum value of an amplitude extracted by the second vibration waveform extracting section at a predetermined sampling time interval has reached the predetermined value read from the predetermined value storing section; and a boiling determining section for determining, when the predetermined value determining section determines that the maximum value has reached the predetermined value, that the object to be heated is in the boiling state.

2. The induction heating cooker according to claim 1, wherein the second vibration waveform extracting section extracts the amplitude of the frequency component having the frequency of about twice as large as the induction heating frequency by subjecting the vibration waveform detected by the first vibration waveform extracting section to a fast Fourier transformation.

3. The induction heating cooker according to claim 1, wherein the second vibration waveform extracting section calculates an absolute value of a difference between a peak value and a bottom value of the vibration waveform extracted by the first vibration waveform extracting section, so as to extract the calculated absolute value, as the amplitude of the frequency component having the frequency of about twice as large as the induction heating frequency.

4. The induction heating cooker according to claim 1, wherein the determining section determines that another object to be heated is put in the cooking vessel, based on the vibration waveform extracted by the second vibration waveform extracting section.

5. The induction heating cooker according to claim 1, further comprising a heating controlling section for controlling the plurality of induction heating sections depending on the determination of whether the object to be heated is in the boiling state.

6. The induction heating cooker according to claim 1, further comprising:

a heating controlling section for controlling the plurality of induction heating sections depending on the determination of whether the object to be heated is in the boiling state; and a changing section for changing at least one of a predetermined value, and the waveform change pattern stored in the waveform change pattern storing section, depending on at least one of the determination of whether the object to be heated is in the boiling state, and a controlled state of the plurality of induction heating sections to be controlled by the heating controlling section.

7. The induction heating cooker according to claim 1, wherein the determining section determines whether the object to be heated is in the boiling state, exclusively based on a waveform change pattern of a vibration waveform of the cooking vessel.

8. The induction heating cooker according to claim 1, wherein the induction heating cooker further includes:

a plurality of temperature detecting sections for detecting temperatures of the cooking vessels, respectively; and a heating controlling section for lowering an induction heating output of one of the induction heating sections, based on the temperature of each of the cooking vessels detected by the temperature detecting sections, and the determining section determines whether the state of the object to be heated is in the boiling state with respect to each of the induction heating sections by detecting a change in the second vibration waveform extracted by the vibration waveform extracting section.

9. The induction heating cooker according to claim 1, wherein each of the plurality of vibration detecting sections respectively detects the vibration of one of the cooking vessels in an ultrasonic frequency band, and respectively detects the vibration of one of the cooking vessels in an audible frequency band, the second vibration waveform extracting section extracts a first vibration waveform of the frequency component having the frequency of about twice as large as the induction heating frequency, from a waveform of the vibration in the ultrasonic frequency band extracted by the first vibration waveform extracting section, and extracts a second vibration waveform of the vibration in the audible frequency band extracted by the first vibration waveform extracting section, and the determining section determines whether the object to be heated is in the boiling state, based on the first vibration waveform extracted by the second vibration waveform extracting section to compensate for the determination as to the boiling state, based on a change in the second vibration waveform extracted by the second vibration waveform extracting section.

* * * * *